(12) United States Patent
Takehara

(10) Patent No.: US 10,239,468 B2
(45) Date of Patent: Mar. 26, 2019

(54) METHOD OF ATTACHING VEHICLE-MOUNTED CAMERA

(71) Applicant: NIDEC ELESYS CORPORATION, Kawasaki-shi, Kanagawa (JP)

(72) Inventor: Yushi Takehara, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 163 days.

(21) Appl. No.: 15/248,141

(22) Filed: Aug. 26, 2016

(65) Prior Publication Data

US 2017/0057421 A1   Mar. 2, 2017

(30) Foreign Application Priority Data

Aug. 27, 2015   (JP) ................. 2015-168101
Dec. 22, 2015   (JP) ................. 2015-249839
Jul. 28, 2016   (JP) ................. 2016-148808

(51) Int. Cl.
B60R 11/00     (2006.01)
B60R 11/04     (2006.01)
H04N 5/225     (2006.01)

(52) U.S. Cl.
CPC ........... *B60R 11/04* (2013.01); *H04N 5/2252* (2013.01); *H04N 5/2257* (2013.01); *B60R 2011/0026* (2013.01); *B60R 2011/0063* (2013.01); *B60R 2011/0071* (2013.01)

(58) Field of Classification Search
CPC ............. B60R 11/04; B60R 2011/0071; B60R 2011/0063; B60R 2011/0026; H04N 5/2257; H04N 5/2252
See application file for complete search history.

(56) References Cited

U.S. PATENT DOCUMENTS

2014/0160284 A1   6/2014   Achenbach et al.
2015/0042874 A1   2/2015   Takeda

FOREIGN PATENT DOCUMENTS

JP   2010-089745 A   4/2010

OTHER PUBLICATIONS

Takeda, N.; "Method of Manufacturing Vehicle-Mounted Camera Housing, Vehicle-Mounted Camera Housing, and Vehicle-Mounted Camera," U.S. Appl. No. 14/658,452, filed Mar. 16, 2015.
Takeda, N.; "Vehicle-Mounted Camera, Method of Manufacturing Vehicle-Mounted Camera, and Method of Manufacturing Vehicle Body," U.S. Appl. No. 15/067,503, filed Mar. 11, 2016.
(Continued)

*Primary Examiner* — Michael N Orlando
*Assistant Examiner* — Joshel Rivera
(74) *Attorney, Agent, or Firm* — Keating & Bennett, LLP

(57) ABSTRACT

A method of attaching a vehicle-mounted camera includes assuming in advance a plurality of inclination angles as inclination angles of a glass surface, assuming in advance a plurality of positioning angles smaller in number than the plurality of inclination angles, specifying an inclination angle of the glass surface of a vehicle body to which the vehicle-mounted camera is to be attached, selecting at least one positioning angle from the assumed plurality of positioning angles and preparing a positioning member having the selected positioning angle, and fixing the vehicle-mounted camera to the glass surface of the vehicle body via the prepared positioning member.

40 Claims, 11 Drawing Sheets

(56) References Cited

OTHER PUBLICATIONS

Takeda, N.; "Method of Manufacturing Vehicle-Mounted Camera Housing, Vehicle-Mounted Camera Housing, and Vehicle-Mounted Camera," U.S. Appl. No. 15/181,626, filed Jun. 14, 2016.
Takehara, Y.; "Method of Manufacturing Vehicle," U.S. Appl. No. 15/248,149, filed Aug. 26, 2016.
Onishi, M.; "Vehicle-Mounted Camera and Method of Manufacturing Vehicle-Mounted Camera," U.S. Appl. No. 15/248,156, filed Aug. 26, 2016.

METHOD OF ATTACHING VEHICLE-MOUNTED CAMERA

BACKGROUND OF THE INVENTION

1. Field of the Invention

The present invention relates to a method of attaching a vehicle-mounted camera.

2. Description of the Related Art

There has been used a vehicle-mounted camera that performs image processing of an image captured by a camera attached to a vehicle to extract information regarding a traffic lane, a preceding vehicle, an oncoming vehicle, a person, or a traffic sign from the image. The vehicle-mounted camera is applied to a vehicle-mounted system that supports safe traveling of the vehicle.

In recent years, a variety of sensors such as a rain sensor, an illuminance sensor, and a millimeter wave sensor or a laser radar sensor have been mounted on vehicles. Therefore, an attachment space for the vehicle-mounted camera is required to be reduced. Further, the vehicle-mounted camera needs to be prevented from hindering driving of a driver, for example, blocking the visual field of the driver or giving an oppressive or claustrophobic feeling to the driver. The vehicle-mounted camera is therefore attached along the front window of the vehicle.

When the vehicle-mounted camera is attached to the vehicle, angle adjustment (optical axis adjustment) needs to be performed (see Japanese Patent Application Laid-Open No. 2010-89745). Japanese Patent Application Laid-Open No. 2010-89745 describes an optical-axis adjusting system including driving means for driving a posture of the vehicle-mounted camera according to operation from the outside and retaining means for retaining the driving means in a predetermined position.

However, since the vehicle-mounted camera described in Japanese Patent Application Laid-Open No. 2010-89745 includes angle adjusting mechanisms such as the driving means and the retaining means, the number of components increases and the structure of the vehicle-mounted camera is complicated. As a result, an increase in costs of the vehicle-mounted camera is caused. Moreover, the vehicle-mounted camera is increased in size.

SUMMARY OF THE INVENTION

Preferred embodiments of the present invention provide a method of attaching a vehicle-mounted camera that is low in costs and easy in angle adjustment of an optical axis.

A method of attaching a vehicle-mounted camera according to a preferred embodiment of the present invention is a method of attaching a vehicle-mounted camera including a cover housing including a tabular top plate and a camera main assembly, the vehicle-mounted camera being attached to a glass surface on a vehicle interior side of a window glass via a positioning member in a posture in which the top plate extends along the window glass facing forward or rearward of a vehicle body, and capable of capturing an image of a scene of a vehicle exterior, the method including assuming in advance a plurality of inclination angles as inclination angles of the glass surface; assuming in advance a plurality of positioning angles smaller in number than the plurality of inclination angles; specifying an inclination angle of the glass surface of the vehicle body to which the vehicle-mounted camera is to be attached to provide a specified inclination angle; selecting at least one positioning angle from the plurality of positioning angles assumed in advance and preparing a positioning member having the at least one positioning angle selected to provide a prepared positioning member; and fixing the vehicle-mounted camera to the glass surface of the vehicle body via the prepared positioning member; wherein the camera main assembly includes a lens assembly and an image sensor; the cover housing includes an attachment seat; a surface of the prepared positioning member includes a housing-side positioning portion to come into contact with the attachment seat at at least three housing-side contact points and a glass-side positioning portion to come into contact with the glass surface of the vehicle body at at least three glass-side contact points; one point among the at least three housing-side contact points is provided in a position different from a straight line passing through remaining points of the at least three housing-side contact points; one point among the at least three glass-side contact points is provided in a position different from a straight line passing through remaining points of the at least three glass-side contact points; the at least one positioning angle selected is a difference between a direction determined by the at least three housing-side contact points and a direction determined by the at least three glass-side contact points; the at least one positioning angle selected is selected by a method of referring to the specified inclination angle of the glass surface and a difference between the direction determined by the at least three housing-side contact points and a direction of an optical axis of the camera main assembly; the vehicle-mounted camera includes: a board connected to the camera main assembly and accommodated in the cover housing; and a processing circuit mounted on the board and capable of executing, by electronically processing an image captured by the camera main assembly, at least attachment direction detection processing and direction calculation processing; in the attachment direction detection processing, in a state in which the vehicle-mounted camera is attached to the glass surface via the positioning member, a target object image of a target object for direction detection located in a known direction when viewed from the vehicle body is acquired through image-capturing by the camera main assembly; a position of the target object for direction detection on the target object image is detected; an attachment direction deviation of the camera main assembly calculated using the known direction and the position of the target object for direction detection is retained in the processing circuit; and in the direction calculation processing, from a position on an image of an object captured by the camera main assembly, a direction in which the object is located when viewed from the vehicle body is calculated using both of the known direction and the position of the target object for direction detection or the attachment direction deviation.

With various preferred embodiments according to the present invention, it is possible to provide a method of attaching a vehicle-mounted camera that is low in costs and easy in angle adjustment of an optical axis.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
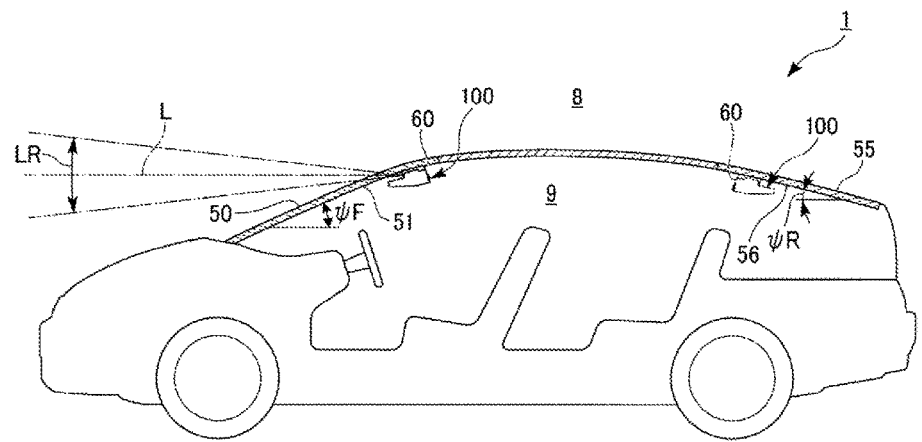
FIG. 1 is a sectional schematic view of a vehicle body according to a preferred embodiment of the present invention.

A method of attaching a vehicle-mounted camera 100 according to a preferred embodiment of the present invention will be described with reference to the drawings.

Note that, in the drawings referred to below, non-characterizing portions may be excluded from the illustration.

In the following explanation of the method of attaching the vehicle-mounted camera 100, the vehicle width direction of a vehicle body 1 at the time when the vehicle-mounted camera 100 is attached to the vehicle body 1 is defined as the width direction or left-right direction of the vehicle-mounted camera 100, the front-back direction of the vehicle body 1 is defined as the front-back direction of the vehicle-mounted camera 100, and the vertical direction of the vehicle body 1 is defined as the vertical direction of the vehicle-mounted camera 100. Note that the postures and the layout of members of the vehicle-mounted camera 100 are illustrative only and can be modified without departing from the spirit of the present invention.

FIG. 1 is a sectional schematic view of the vehicle body 1 mounted with the vehicle-mounted camera 100. The vehicle body 1 preferably includes a window glass 50 facing forward (hereinafter, front window) and a window glass 55 facing rearward (hereinafter, rear window). The vehicle-mounted camera 100 is attached to a glass surface 51 on a vehicle interior 9 side of the front window 50 via an attachment member 60 and used to capture an image of a scene ahead of a vehicle exterior 8.

Note that, as indicated by an alternate long and two short dashes line in FIG. 1, the vehicle-mounted camera 100 may be attached to a glass surface 56 on the vehicle interior 9 side of the rear window 55 via the attachment member 60. When the vehicle-mounted camera 100 is attached to the rear window 55, the vehicle-mounted camera 100 is used to capture an image of a scene behind the vehicle exterior 8.

Figure 2:
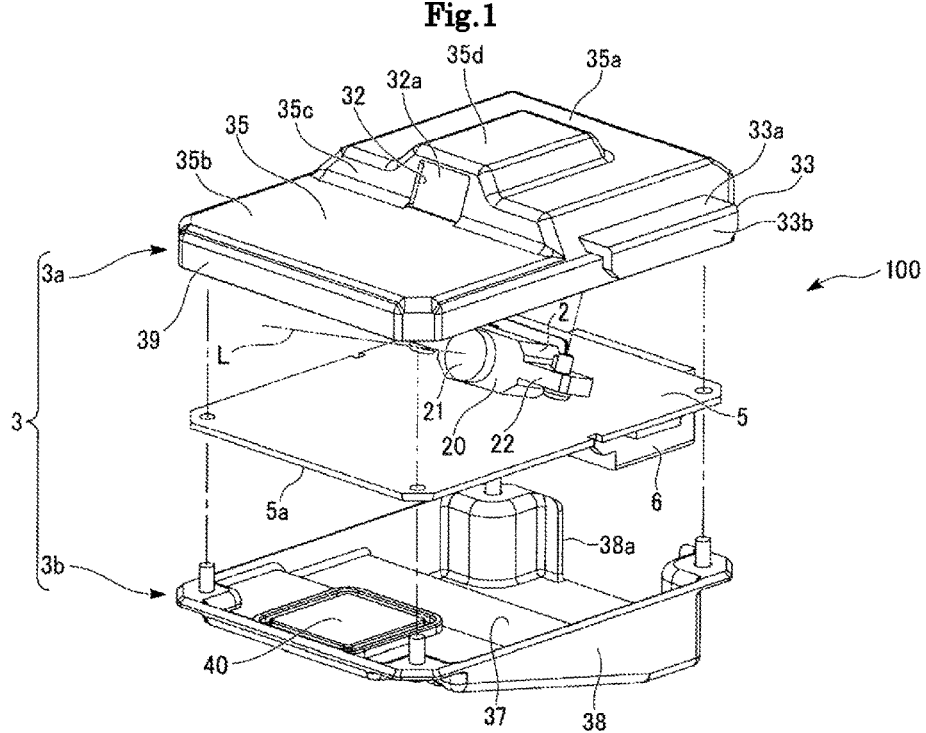
FIG. 2 is an exploded perspective view of a vehicle-mounted camera according to a preferred embodiment of the present invention.
Figure 3:
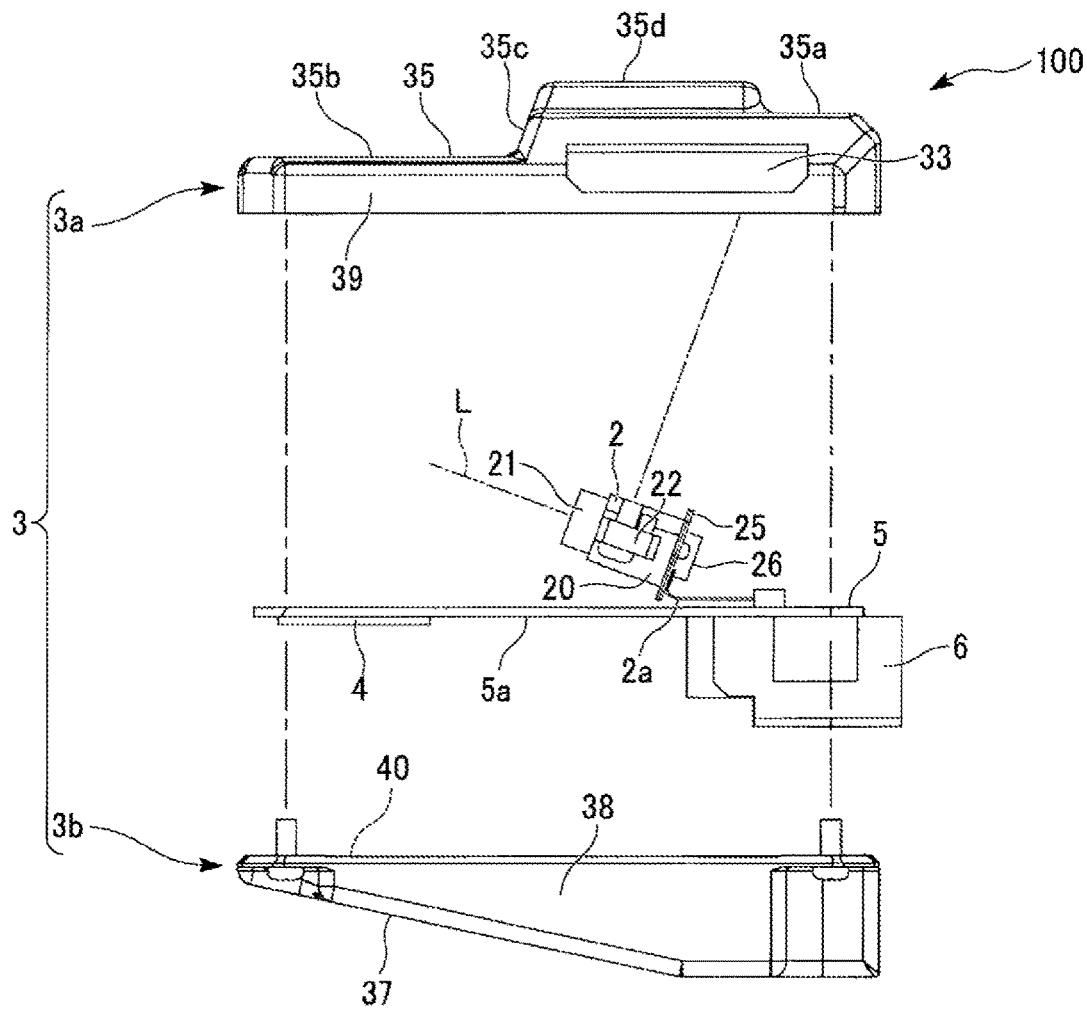
FIG. 3 is an exploded side view of the vehicle-mounted camera according to a preferred embodiment of the present invention.
Figure 4:
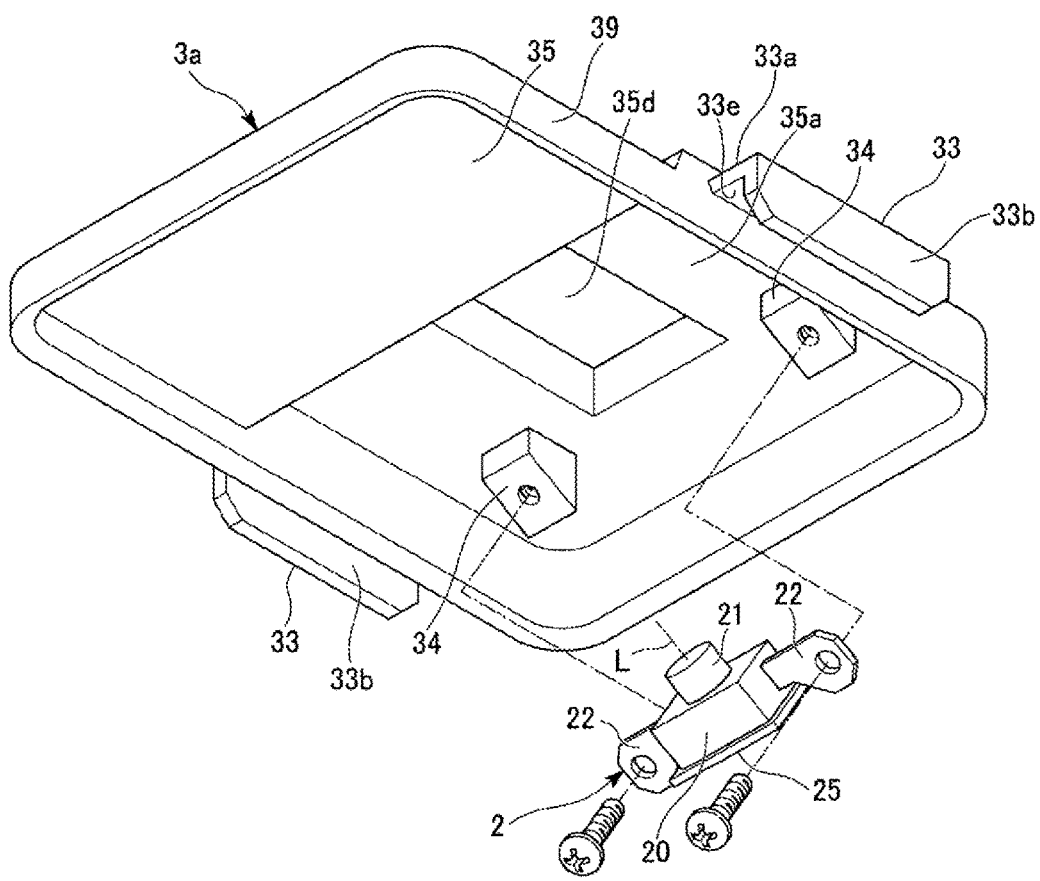
FIG. 4 is an exploded perspective view of the vehicle-mounted camera according to a preferred embodiment of the present invention.

FIGS. 2 to 4 are exploded views of the vehicle-mounted camera 100. Note that, in FIG. 4, illustration of a processing board (a board) 5 and a base housing 3b is omitted for the sake of simplicity.

As shown in FIGS. 2 and 3, the vehicle-mounted camera 100 preferably includes a housing 3, a camera main assembly 2, and a processing board 5. The housing 3 includes a cover housing 3a and a base housing 3b.

The processing board 5 stores an image and a video captured by the camera main assembly 2 or transmits the image and the video to other apparatuses. As shown in FIG. 3, a processing circuit element (preferably defined by a processing circuit, for example) 4, a connector 6, and a power supply circuit element, a capacitor, a microcomputer, an IC, and the like, all of which are not specifically illustrated in the drawings, are mounted on the processing board 5. The processing board 5 is preferably connected to the camera main assembly 2 via a wire 2a. Examples of modes and wiring of the power supply circuit element, the capacitor, the microcomputer, and the IC are described in U.S. Patent Application Publication No. 2016/0091602, filed Sep. 23, 2015; U.S. Patent Application Publication No. 2015/0042798, filed Aug. 8, 2013; and U.S. Patent Application Publication No. 2015/0042874, filed May 5, 2014, which are hereby all incorporated herein by reference in their entireties.

The processing circuit element 4 electronically processes an image captured by an image sensor 26 of the camera main assembly 2. The processing circuit element 4 is provided in a front portion of a lower surface 5a of the processing board 5. The processing circuit element 4 performs processing to extract various characteristic objects such as a vehicle, a pedestrian, and a traffic lane concerning visual information focused on the image sensor 26. The processing circuit element 4 is in contact with the base housing 3b via a heat radiation member 40. Examples of the heat radiation member 40 include a heat radiation plate (sheet) and a heat radiation gel. As the material of the heat radiation plate (sheet) and the heat radiation gel, a silicon-based material or the like is used. The processing circuit element 4 generates heat when the vehicle-mounted camera 100 is driven. Since the processing circuit element 4 is in contact with the base housing 3b via the heat radiation member 40, heat radiation performance of the vehicle-mounted camera 100 is improved.

A wire extending to a not-shown external apparatus is connected to the connector 6 (which preferably, for example, a power supply connector). The connector 6 is preferably provided in a rear portion of the lower surface 5a of the processing board 5. The connector 6 relays power supply and communication to the vehicle-mounted camera 100.

In preferred embodiments of the present invention, another processing board can also be used instead of the processing board 5. The examples of the processing board are described in U.S. Patent Application Publication No. 2015/0042798, filed Aug. 8, 2013; U.S. Patent Application Publication No. 2015/0042874, filed May 5, 2014; and Japanese Patent Application No. 2015-254737, filed Dec. 25, which are hereby all incorporated herein by reference in their entireties.

The housing 3 houses the processing board 5 and mounted components on the processing board 5 and the camera main assembly 2.

The housing 3 preferably includes the cover housing 3a that supports the camera main assembly 2 and the base housing 3b attached on the lower side of the cover housing 3a to support the processing board 5. Note that the housing 3 may alternatively not include the base housing 3b if so desired. If the housing 3 does not include the base housing 3b, the processing board 5 is fixed to the lower surface of the cover housing 3a.

As shown in FIG. 2, the cover housing 3a preferably includes a tabular top plate 35, a peripheral edge portion 39 extending to the lower side from the peripheral edge of the top plate 35, and a pair of attachment seats 33. The cover housing 3a is fixed to the base housing 3b by screws in the peripheral edge portion 39. Note that the cover housing 3a may not include the peripheral edge portion 39 as long as the cover housing 3a includes the top plate 35.

The top plate 35 includes a top plate front portion 35b, a top plate rear portion 35a, and a riser 35c. The top plate front portion 35b is located in a front region in the top plate 35. The top plate rear portion 35a is located in a rear region of the top plate front portion 35b. The top plate rear portion 35a is located above the top plate front portion 35b. The riser 35c is disposed in the boundary between the top plate rear portion 35a and the top plate front portion 35b.

A camera housing portion 35d is preferably provided in the width direction center of the top plate rear portion 35a. The camera housing portion 35d has a shape projecting above the top plate rear portion 35a. The camera main assembly 2 is accommodated in a space below the camera housing portion 35d.

In the riser 35c, a viewing window 32 is provided in a portion located in the front of the camera housing portion 35d. The viewing window 32 is an opening through which an optical axis L of the camera main assembly 2 passes. The camera main assembly 2 captures an image on the outside of the vehicle through the viewing window 32. The viewing window 32 is closed by a transparent plate 32a that prevents ingress of dust into the inner side of the housing 3.

As shown in FIG. 4, the attachment seats 33 are respectively provided on width direction both sides of the peripheral edge portion 39 of the cover housing 3a. The attachment seats 33 are used for attachment of the vehicle-mounted camera 100 to the vehicle body 1 described below. The attachment seats 33 extend in the front-back direction in a uniform sectional shape. The attachment seats 33 include width-direction projections 33a projecting toward the width direction outer side and downward projections 33b projecting downward from the distal ends of the width-direction projections 33a.

The base housing 3b preferably covers the processing board 5 from the lower side. The thickness of the base housing 3b gradually decreases from the back to the front. The base housing 3b includes a sidewall portion 38 and a bottom portion 37. The heat radiation member 40 is provided in a front portion of the bottom portion 37 in a position brought into contact with the processing circuit element 4. The sidewall portion 38 extends upward from the peripheral edge of the bottom portion 37. An opening 38a is provided in a rear portion of the sidewall portion 38. Since the opening 38a is provided, the connector 6 mounted on the processing board 5 is exposed from the rear side of the sidewall portion 38. It is possible to connect a wire (not shown in the figure) extending to the external apparatus.

In this preferred embodiment of the present invention, the cover housing 3a and the base housing 3b are preferably made of, for example, aluminum or an aluminum alloy and are preferably molded by pressing or a die cast forging method. Since the cover housing 3a and the base housing 3b are made of aluminum or an aluminum alloy, it is possible to increase a heat capacity of the entire housing 3 and transfer heat generated from the processing board 5 to effectively cool the processing board 5.

As shown in FIG. 4, the camera main assembly 2 is fixed to the cover housing 3a in a seat used in camera fixing 34. Since the cover housing 3a is made of aluminum or an aluminum alloy, it is possible to significantly reduce or prevent deformation due to an external force and to secure attachment accuracy of the camera main assembly 2.

The camera main assembly 2 is a device used in capturing an image of a scene ahead of the vehicle body 1 as visual information.

As shown in FIG. 3, the camera main assembly 2 has one optical axis L. The camera main assembly 2 preferably includes a base assembly 20, a lens assembly 21, an image sensor board 25, and the image sensor 26.

The lens assembly 21 includes a plurality of lenses, the optical axes of which are aligned, and a barrel having a cylindrical shape that holds the lenses. A common optical axis of the plurality of lenses is the optical axis L of the camera main assembly 2. The lens assembly 21 projects to the front of the base assembly 20 and is fixed to the base assembly 20. The image sensor 26 is disposed behind the lens assembly 21.

The image sensor board 25 is fixed to the rear surface of the base assembly 20. The image sensor 26 is mounted on the image sensor board 25.

The image sensor 26 acquires visual information in an outside world as an image. The image sensor 26 captures an object image focused through the lens assembly 21. As the image sensor 26, for example, a CMOS image sensor is used.

The base assembly 20 is pierced through by the lens assembly 21. The base assembly 20 holds the outer circumference of the lens assembly 21.

As shown in FIG. 4, a pair of camera-side pedestals 22 extending to the outer side is provided on width direction both sides of the base assembly 20.

Attachment of the vehicle-mounted camera 100 to the vehicle body 1 by the attachment member 60 will now be described.

Figure 5:
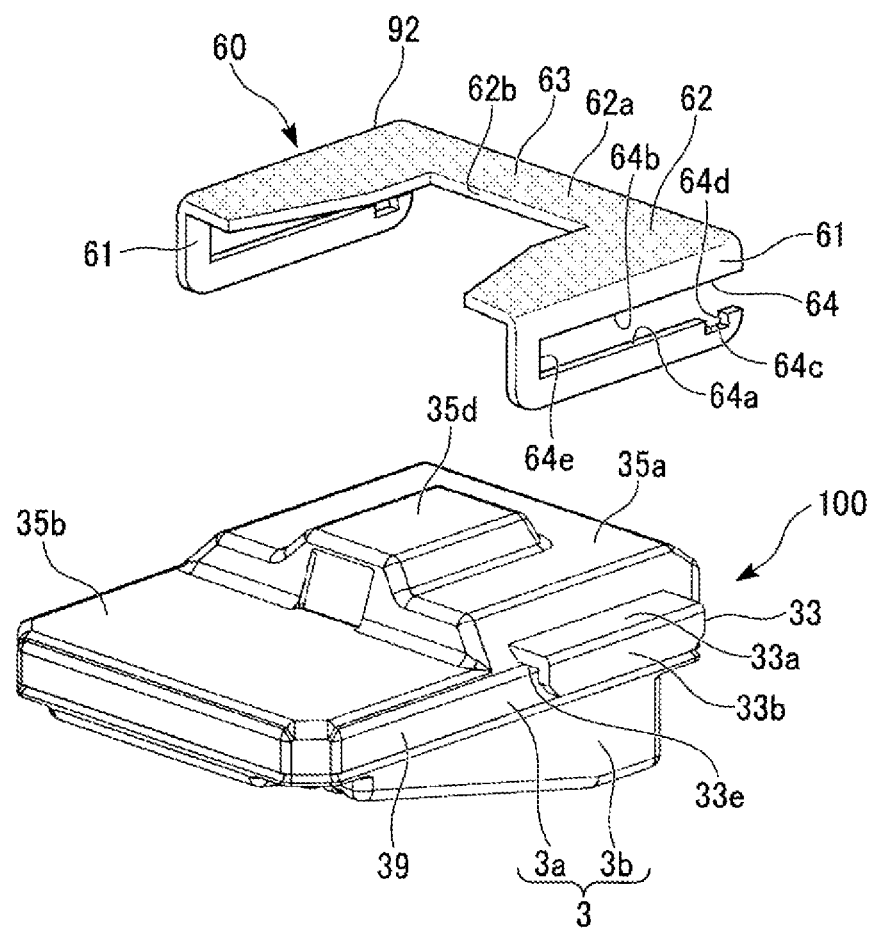
FIG. 5 is a perspective view of the vehicle-mounted camera and an attachment member according to a preferred embodiment of the present invention.
Figure 6:
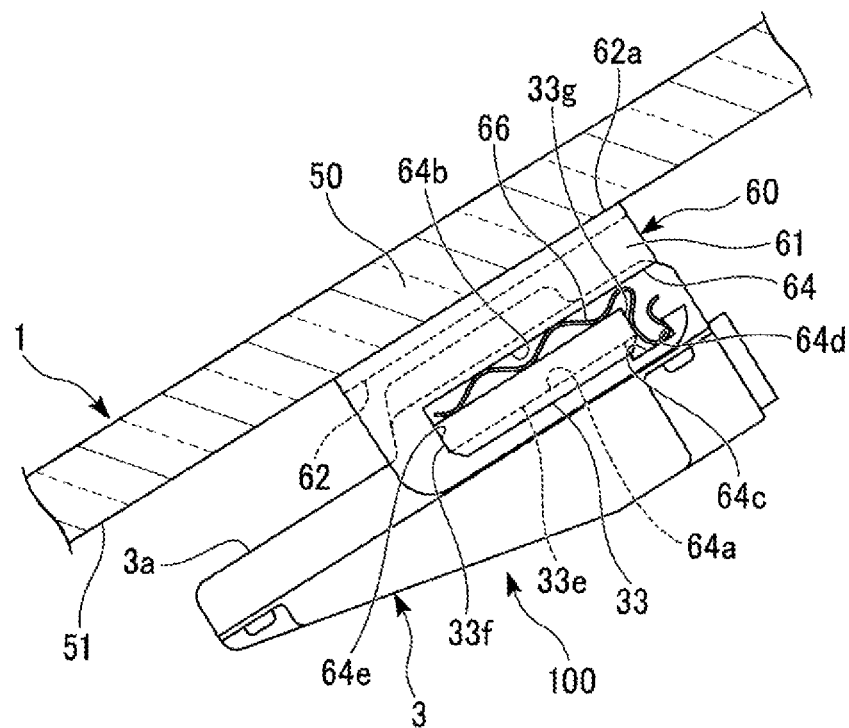
FIG. 6 is a side view of the vehicle-mounted camera and the attachment member according to a preferred embodiment of the present invention and shows a state in which the vehicle-mounted camera is attached to a front window.

FIG. 5 is a perspective view of the vehicle-mounted camera 100 supported by the attachment member (preferably defined as a positioning member) 60. FIG. 6 is a side view of the vehicle-mounted camera 100 showing a state in which the vehicle-mounted camera 100 is attached to the vehicle body 1 via the attachment member 60.

The attachment member 60 is fixed to the glass surface 51 of the front window 50 and supports the cover housing 3a of the vehicle-mounted camera 100. The attachment member 60 determines an attachment angle around an axis extending in the width direction of the cover housing 3a with respect to the glass surface 51. That is, the attachment member 60 functions as a positioning member that determines the position and the posture of the vehicle-mounted camera 100 with respect to the glass surface 51.

In this preferred embodiment of the present invention, the attachment member 60 is preferably made of steel. Since the attachment member 60 made of steel has sufficient rigidity, the attachment member 60 is less easily deformed under an external force. Consequently, it is possible to improve accuracy of a positioning angle of the attachment member 60. The attachment member 60 is more preferably made of stainless steel excellent in corrosion resistance among various kinds of steel.

The attachment member 60 is fixed to a predetermined position of the front window 50, for example, the glass surface 51 near a rear-view mirror. The attachment member 60 supports the vehicle-mounted camera 100 such that the top plate 35 of the cover housing 3a takes a posture extending along the front window 50 of the vehicle body 1. Since the vehicle-mounted camera 100 is attached along the glass surface 51, the vehicle-mounted camera 100 does not block the forward visual field of the driver.

As shown in FIG. 6, the attachment member 60 preferably includes a glass surface fixing portion 62 having a flat shape and a pair of housing fixing portions 61 extending downward from width direction both end portions of the glass surface fixing portion 62. In this preferred embodiment of the present invention, the housing fixing portions 61 also have a tabular shape. The attachment member 60 is fixed to the glass surface 51 in the glass surface fixing portion 62 and fixed to the cover housing 3a in the pair of housing fixing portions 61.

As shown in FIG. 5, a cutout portion 62b extending rearward from the front side is provided in the glass surface fixing portion 62 of the attachment member 60. The cutout portion 62b is provided in a position overlapping the camera housing portion 35d of the cover housing 3a in a plan view. In a state in which the vehicle-mounted camera 100 is supported by the attachment member 60, the glass surface fixing portion 62 covers, from the upper side, the top plate rear portion 35a excluding the camera housing portion 35d in the top plate 35 of the cover housing 3a.

As shown in FIG. 6, an upper surface 62a of the glass surface fixing portion 62 functions as a glass-side positioning portion configured to contact the glass surface 51 and determine a position of the attachment member 60 with respect to the glass surface 51. That is, the surface of the attachment member 60 includes the glass-side positioning portion (the upper surface) 62a. In this preferred embodiment of the present invention, the glass-side positioning portion 62a is preferably a flat surface.

The glass-side positioning portion 62a is in contact with the glass surface 51 via an adhesive to be fixed to the glass surface 51. Note that the glass-side positioning portion 62a may be fixed to the glass surface 51 via a double sided tape, on both surfaces of which adhesive layers including an adhesive are provided.

The glass-side positioning portion 62a in this preferred embodiment of the present invention is in surface contact with the glass surface 51. However, the contact of the glass-side positioning portion 62a and the glass surface 51 may not be the surface contact if so desired. The glass-side positioning portion 62a only has to be in contact with the glass surface 51 at at least three glass-side contact points. In this case, one point among the at least three glass-side contact points is provided in a position different from a straight line passing through the other two points. Since the glass-side positioning portion 62a and the glass surface 51 are set in contact at three or more points not aligned on a specific straight line, a degree of freedom of the glass-side positioning portion 62a with respect to the glass surface 51 can be set to zero. Consequently, the attachment member 60 is stably fixed to the glass surface 51. Deviation of an attachment direction less easily occurs. The glass-side positioning portion 62a is in contact with the glass-side contact points via an adhesive or a double sided tape including adhesive layers. However, the glass-side positioning portion 62a may be directly in contact with the glass-side contact points.

Note that, in this preferred embodiment of the present invention, since the glass-side positioning portion 62a and the glass surface 51 are in surface contact, innumerable glass-side contact points are present and define a glass-side contact surface 63. Therefore, the glass-side contact surface 63 includes the three glass-side contact points not aligned on a specific straight line.

As shown in FIG. 5, the glass-side contact surface 63 is surrounded by a second edge 92, which is an edge portion configuring the external shape of the glass surface fixing portion 62. That is, the glass-side positioning portion 62a includes a second edge 92 configured to come into contact with the glass surface 51. At least one point among the glass-side contact points is located on the second edge 92.

Note that, even when the contact of the glass surface fixing portion 62 and the glass surface 51 is not the surface contact, since the glass surface fixing portion 62 and the glass surface 51 are in contact at the second edge 92, the attachment member 60 is stably fixed to the glass surface 51.

As shown in FIG. 5, the housing fixing portions 61 extend in the front-back direction and the vertical direction. In a state in which the vehicle-mounted camera 100 is fixed to the attachment member 60, the housing fixing portions 61 are located on width direction both sides of the cover housing 3a and cover a portion of the peripheral edge portion 39 of the cover housing 3a. In the housing fixing portions 61, openings for attachment 64 piercing through the housing fixing portions 61 in the width direction are preferably provided. The openings for attachment 64 are cutout-shaped slits extending in the front-back direction and opened rearward.

The openings for attachment 64 include mounting surfaces 64a and upper side surfaces 64b opposed vertically. Concaves 64c recessed toward the lower side are provided on the rear side on mounting surfaces 64a. As shown in FIG. 6, the attachment seats of the cover housing 3a are inserted into the openings for attachment 64 from the back to the front. Consequently, the attachment seats 33 are mounted on the mounting surfaces 64a. Wavy leaf springs 66 are held between the upper side surfaces 64b and the attachment seats 33 in the vertical direction. The leaf springs 66 press the attachment seats 33 against the mounting surfaces 64a and stabilize the contact of the attachment seats 33 and the mounting surfaces 64a. The leaf springs 66 extend to the rear side and are disposed between rear end surfaces 33g of the attachment seats 33 and surfaces 64d facing the front of the concaves 64c. The leaf springs 66 press the attachment seats 33 forward and set front end surfaces 33f of the attachment seats 33 in contact with surfaces 64e facing rearward of the openings for attachment 64. Consequently, the leaf springs 66 prevent the vehicle-mounted camera 100 from moving in the front-back direction with respect to the attachment member 60.

Figure 7:
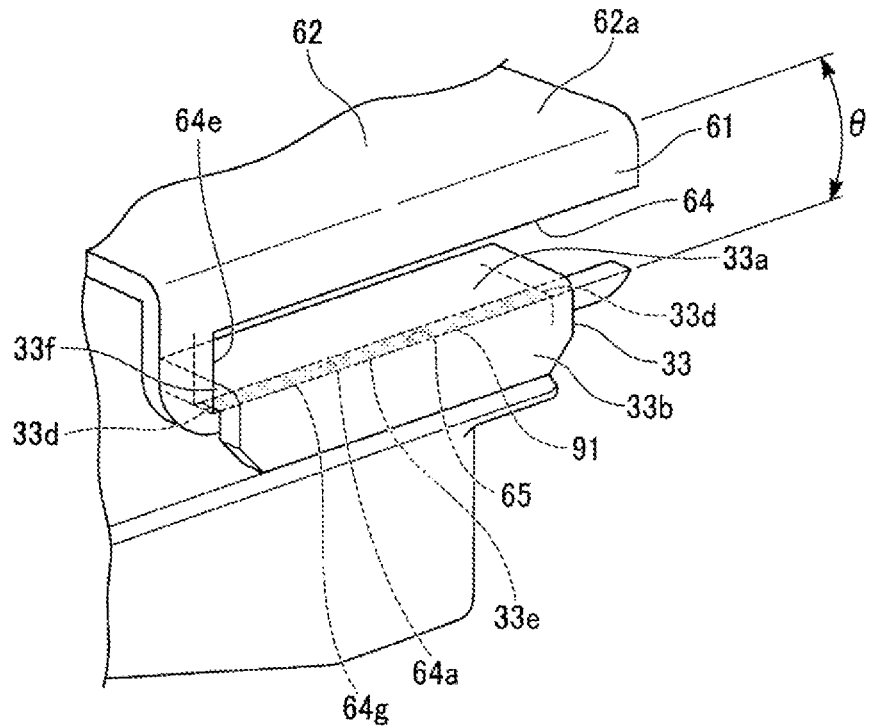
FIG. 7 is an enlarged perspective view of an attachment seat fit in an attachment opening according to a preferred embodiment of the present invention.

FIG. 7 is an enlarged perspective view of the attachment seat 33 fit in the attachment opening 64. Note that, in FIG. 7 and the subsequent figures, illustration of the leaf spring 66 and the concave 64c of the attachment opening 64 are omitted. As shown in FIG. 7, the attachment seat 33 is supported by the housing fixing portion 61 in a state in which a seat surface 33e located on the lower side of the width-direction projection 33a is in contact with the mounting surface 64a. The downward projection 33b of the attachment seat 33 is located on a width direction outer side of the housing fixing portion 61 and prevents the attachment seat 33 from slipping off from the attachment opening 64 of the housing fixing portion 61. Further, the downward projection 33b prevents movement to the width direction inner side of the cover housing 3a with respect to the housing fixing portion 61. Since the downward projections 33b are respectively provided on the width direction both sides of the cover housing 3a, the downward projections 33b prevent movement to the width direction inner side of the cover housing 3a on the width direction both sides. Consequently, the cover housing 3a is stably supported by the housing fixing portion 61. Note that a width dimension on the inner side of the pair of housing fixing portions 61 may be set slightly smaller than a width direction dimension of the peripheral edge portion 39 of the cover housing 3a. The cover housing 3a may be supported in a state in which the peripheral edge portion 39 is pressurized by the pair of housing fixing portions 61. The vehicle-mounted camera 100 is prevented from moving in the left-right direction with respect to the attachment member 60 by this structure. Further, width direction inner side surfaces of the pair of downward projections 33b may be set slightly smaller than the width direction dimension of the peripheral edge portion 39 of the cover housing 3a. The cover housing 3a may be pinched and supported by the pair of downward projections 33b. In this case, the attachment member 60 supports the vehicle-mounted camera 100 without being affected by vibration.

The mounting surface 64a of the housing fixing portion 61 functions as a housing-side positioning portion configured to come into contact with the seat surface 33e of the attachment seat 33 and determine a position of the attachment seat 33 with respect to the attachment member 60. That is, the surface of the attachment member 60 includes the housing-side positioning portion (the mounting surface) 64a. In this preferred embodiment of the present invention, the housing-side positioning portion 64a is preferably a flat surface.

The housing-side positioning portion 64a in this preferred embodiment of the present invention is in surface contact with the seat surface 33e of the attachment seat 33. However, the contact of the housing-side positioning portion 64a and the attachment seat 33 may not be the surface contact. The housing-side positioning portion 64a only has to be in contact with the attachment seat 33 at at least three points. In this case, one point among the at least three housing-side contact points is provided in a position different from a straight line passing through the other two points. Since the housing-side positioning portion 64a and the attachment seat 33 are set in contact at three points not aligned on a specific straight line or a plurality of points including three points not aligned on a specific straight line, a degree of freedom of the housing-side positioning portion 64a with respect to the attachment seat 33 can be set to zero. Consequently, the attachment member 60 stably supports the cover housing 3a.

Note that, in this preferred embodiment of the present invention, since the housing-side positioning portion 64a and the attachment seat 33 are in surface contact, innumerable housing-side contact points are present and define a housing-side contact surface 65. Therefore, the housing-side contact surface 65 includes three housing-side contact points that are not aligned on a specific straight line.

The attachment member 60 in this preferred embodiment of the present invention includes the pair of housing fixing portions 61. The pair of housing fixing portions 61 respectively includes the housing-side positioning portions 64a. The pair of housing fixing portions 61 is respectively in surface contact with the attachment seat 33 of the cover housing 3a on the housing-side contact surface 65. However, the pair of housing-side positioning portions 64a preferably only has to be in contact with the attachment seat 33 at three housing-side contact points in total. More specifically, the pair of housing-side positioning portions 64a may have two housing-side contact points in the housing-side positioning portion 64a of one housing fixing portion 61 and have one housing-side contact point in the housing-side positioning portion 64a of the other housing fixing portion 61.

As shown in FIG. 7, the housing-side contact surface 65 is surrounded by a first edge 91. The first edge 91 is derived from a portion of an edge portion 64g of the housing-side positioning portion (the mounting surface) 64a and a portion of edge portions 33d in the front and the back on the lower surface of the width-direction projection 33a of the attachment seat 33. That is, at least one (and in this preferred embodiment of the present invention, both) of the attachment seat 33 and the housing-side positioning portion 64a preferably includes the first edge 91 that comes into contact with the other. At least one point among the housing-side contact points is located on the first edge 91. By adopting such a configuration, even when the contact of the housing fixing portion 61 and the attachment seat 33 is not the surface contact, the housing fixing portion 61 and the attachment seat 33 are in contact at the first edge 91. The attachment member 60 stably supports the cover housing 3a.

Figure 8:
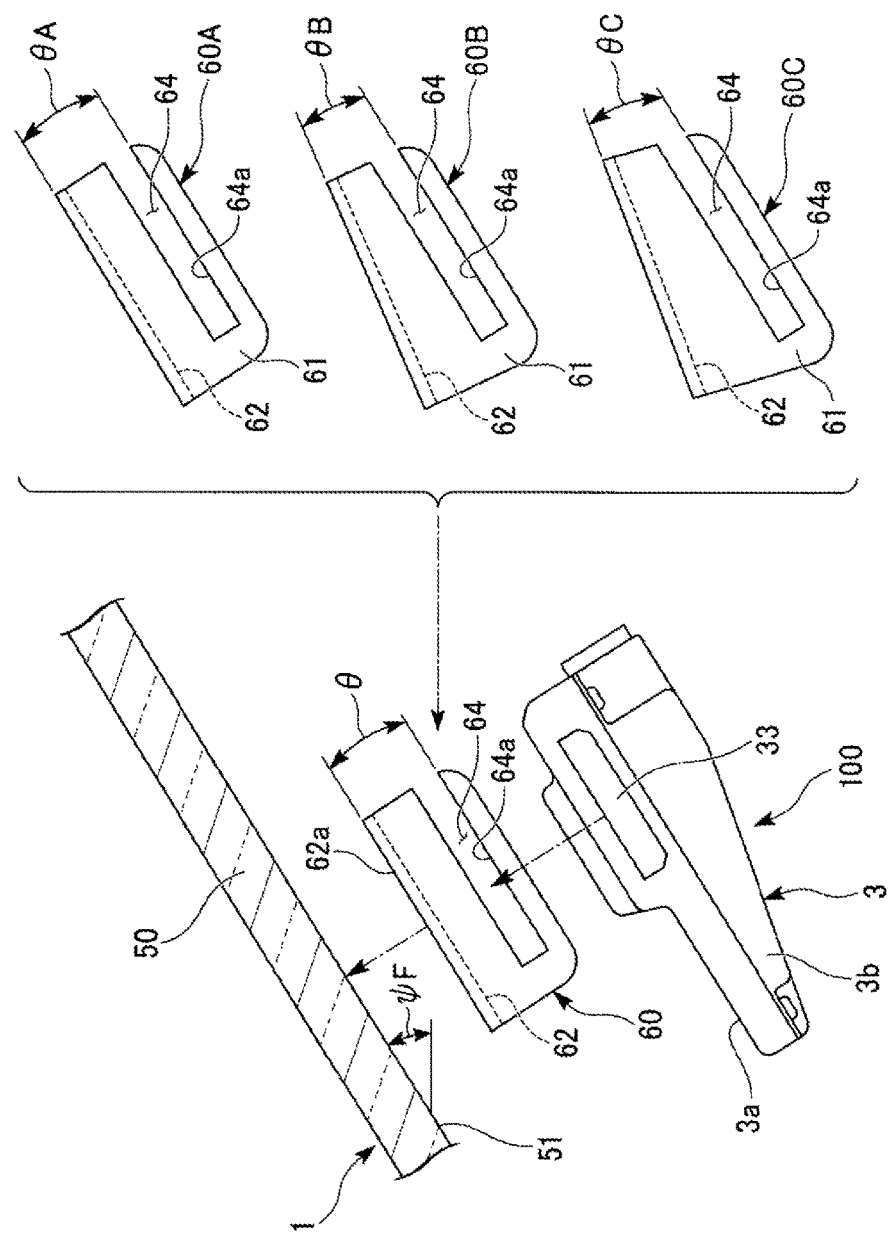
FIG. 8 is a side view of the vehicle-mounted camera and the attachment member according to a preferred embodiment of the present invention and shows a procedure for attaching the vehicle-mounted camera to the vehicle body.

FIG. 8 is a side view of the vehicle-mounted camera 100 and the attachment member 60 (60A, 60B, 60C) showing a procedure for attaching the vehicle-mounted camera 100 to the vehicle body 1 via the attachment member 60. Note that, in FIG. 8, illustration of the concaves 64c (see FIG. 6) provided in the attachment opening 64 of the attachment member 60 (60A, 60B, 60C) is omitted.

As shown in FIG. 8, the housing-side positioning portion (the mounting surface) 64a defines a positioning angle θ with respect to the glass-side positioning portion 62a, which is the upper surface of the glass surface fixing portion 62. As described below, the vehicle-mounted camera 100 is fixed to the glass surface via the attachment member 60 selected from the attachment members 60 (60A, 60B, and 60C) having different positioning angles θ (θA, θB, and θC). Note that, in an illustrated example, the positioning angle θ of the attachment member 60 is preferably 0°. In this description, the positioning angle θ in a direction in which the housing-side positioning portion 64a tilts to the lower side with respect to the glass-side positioning portion 62a toward the front is defined as a positive angle. The positioning angle θ may be 0°, may be a positive angle, or may be a negative angle. That is, the housing-side positioning portion 64a may tilt to the lower side with respect to the glass-side positioning portion 62a toward the front, may tilt to the upper side with respect to the glass-side positioning portion 62a toward the front, and may be parallel or substantially parallel to the glass-side positioning portion 62a.

In the attachment member 60, the glass-side positioning portion 62a, which is the upper surface of the glass surface fixing portion 62, is preferably a cut surface obtained by cutting at least a portion of the surface of the glass-side positioning portion 62a. Similarly, in the attachment member 60, the housing-side positioning portion 64a, which is the mounting surface of the attachment seat 33, is preferably a cut surface obtained by cutting at least a portion of the surface of the housing-side positioning portion 64a.

Since the cut surface has high flatness, when the cut surface is set in surface contact, it is possible to improve attachment accuracy of a contact target object. Since the glass-side positioning portion 62a and the housing-side positioning portion 64a are provided as the cut surfaces, it is possible to improve positional accuracy of the optical axis L of the camera main assembly 2 inside the cover housing 3a with respect to the glass surface 51. Note that it is most preferable to form both of the glass-side positioning portion 62a and the housing-side positioning portion 64a as the cut surfaces. However, a fixed effect can be obtained by forming one of the glass-side positioning portion 62a and the housing-side positioning portion 64a as the cut surface. When one of the glass-side positioning portion 62a and the housing-side positioning portion 64a is formed as the cut surface, it is preferable to form the other surface as a reference surface during the cutting. Consequently, it is possible to improve relative position accuracy of the glass-side positioning portion 62a and the housing-side positioning portion 64a and improve accuracy of the positioning angle θ.

It is preferable to form, as the cut surface, not only the attachment member 60 but also the seat surface 33e of the attachment seat 33 that is in surface contact with the housing-side positioning portion 64a. Consequently, it is possible to perform angle adjustment of the optical axis L at higher accuracy.

As shown in FIG. 1, the glass surface 51 of the front window 50 of the vehicle body 1 tilts at an inclination angle ψF. Each car model of the vehicle body 1 has a different inclination angle ψF. A method of attaching the vehicle-mounted camera 100 to the vehicle body 1 having various inclination angles ψF with the optical axis L of the camera main assembly 2 set to a preferable angle is described. The method of attaching the vehicle-mounted camera 100 described herein includes calibration work for the direction of the vehicle-mounted camera 100 performed when the vehicle-mounted camera 100 is attached to the vehicle body 1.

Note that, when the vehicle-mounted camera 100 is attached to the glass surface 56 of the rear window 55, according to a method same as the method described above, the optical axis L of the camera main assembly 2 is set to a preferable angle with respect to an inclination angle ψR of the glass surface 56 that is different for each of the car models.

In general, the front window 50 curves from the center toward the width direction. In this preferred embodiment of the present invention, the curve of the front window 50 is neglected assuming that the vehicle-mounted camera 100 is attached to the width direction center of the front window 50. Note that, when the vehicle-mounted camera 100 is attached to a position deviating to a width direction one side of the front window 50, the optical axis L tilts in the left-right direction. In this case, the tilt in the left-right direction is able to be corrected by image processing in the processing circuit element 4.

As shown in FIG. 1, the vehicle-mounted camera 100 is attached to the vehicle body 1 such that the optical axis L fit within a tolerable direction range LR having a predetermined angle width. When the optical axis L is outside the tolerable direction range LR, the vehicle-mounted camera 100 cannot sufficiently secure the visual field of the camera main assembly 2 and cannot sufficiently obtain information necessary for vehicle body control. The tolerable direction range LR is set in advance on the basis of the horizontal direction.

Unless specifically described otherwise in the following explanation, as the direction of the optical axis L, the horizontal direction included in the tolerable direction range LR is selected.

First, assumption of the positioning angle θ of the attachment member 60 in a design stage will be described with reference to FIGS. 1 and 8.

In the design stage, in the attachment member 60, the vehicle bodies 1 of various car models are assumed in advance as an attachment target of the vehicle-mounted camera 100. In the design stage, in the attachment member 60, a plurality of inclination angles ψF are assumed in advance as inclination angles of the glass surface 51 of the front window 50 of the vehicle body 1 defined as the attachment target of the vehicle-mounted camera 100. The plurality of inclination angles ψF are, for example, inclination angles ψF in a predetermined angle range (as an example, 18° to 30°). In the design stage, in the attachment member 60, a plurality of positioning angles θA, θB, θC . . . smaller in number than the plurality of inclination angles ψF are assumed in advance. The method of assuming the plurality of positioning angles θA, θB, θC . . . is described below.

The attachment member 60 is manufactured on the basis of the plurality of inclination angles ψF and the plurality of positioning angles θA, θB, θC . . . assumed in advance in the design stage. Note that the plurality of attachment members 60A, 60B, and 60C shown in FIG. 8 have external shapes different from one another. However, a plurality of attachment members different from each other only in terms of an angle of the housing-side positioning portion (the mounting surface) 64a of the attachment opening 64 may be manufactured. In this case, it is possible to manufacture a plurality of kinds of attachment members having different positioning angles by cutting the housing-side positioning portion 64a in molded products molded using the same die.

Next, a selection of the positioning angle θ in an attachment stage of the vehicle-mounted camera 100 will be described. When attachment of the vehicle-mounted camera 100 is performed, the inclination angle ψF of the glass surface 51 of the front window 50 of the vehicle body 1, to which the vehicle-mounted camera 100 is attached, is specified. The inclination angle ψF can be specified by measuring the inclination angle ψF of the attachment target vehicle body 1. As the inclination angle ψF, the inclination angle ψF of the target vehicle body 1 may be specified from a database of inclination angles for each of car models.

Subsequently, on the basis of the specified inclination angle ψF of the glass surface 51 of the vehicle body 1, at least one positioning angle θA is selected from the positioning angles θA, θB, θC . . . assumed in advance.

A method of selecting the positioning angle θ will be described in detail below. Subsequently, the attachment member 60A having the selected positioning angle θA is prepared. A step of preparing the attachment member 60A having the positioning angle θA may be a step of manufacturing the attachment member 60A or may be a step of ordering the attachment member 60A manufactured in another place. The step of preparing the attachment member 60A having the positioning angle θA may be a step of preparing only one kind of attachment member 60A having the selected positioning angle θA or may be a step of preparing in advance the plurality of attachment members (positioning members) 60A, 60B, and 60C respectively having the plurality of positioning angles θA, θB, and θC. In the latter case, the attachment member 60 to be actually used is selected during attachment.

A plurality of positioning angles θA may be selected on the basis of the specified inclination angle ψF of the glass surface 51 of the vehicle body 1. For example, in some case, a plurality of positioning angles θA and θB can be selected with respect to the inclination angle ψF. As shown in FIG. 1, the direction of the optical axis L of the camera main assembly 2 only has to fit within the tolerable direction range LR. Therefore, the plurality of positioning angles θA and θB can be selected if the optical axis L is in a range fit within the tolerable direction range LR. In this case, the plurality of positioning angles θA and θB are selected and the attachment members 60A and 60B respectively having any one of the selected plurality of positioning angles θA and θB can be prepared. Further, one kind of attachment member 60A (or attachment member 60B) is selected from the selected plurality of kinds of attachment members 60A and 60B. This selection can be performed on the basis of, for example, easiness of securing of the visual field of the camera main assembly 2 and easiness of fixing of the attachment members 60A and 60B.

The prepared attachment member 60 (60A) is then fixed to the glass surface 51 of the front window 50. Further, the vehicle-mounted camera 100 is fixed to the attachment member 60 (60A). Consequently, it is possible to fix the vehicle-mounted camera 100 to the glass surface 51 of the vehicle body 1 via the attachment member 60 (60A) selected on the basis of the inclination angle ψF of the glass surface 51. Note that, after the vehicle-mounted camera 100 is attached to the attachment member 60, the attachment member 60 may be fixed to the glass surface 51. It is possible to attach the vehicle-mounted camera 100 to the vehicle body 1 according to various car models through the steps described above.

Subsequently, directional alignment of the vehicle-mounted camera 100 is performed. The directional alignment preferably involves calibration of the vehicle-mounted camera 100 by electronic processing.

As shown in FIG. 1, the optical axis L of the vehicle-mounted camera 100 is set within the tolerable direction range LR. Therefore, the optical axis L of the vehicle-mounted camera 100 sometimes has deviation with respect to a most preferable optical axis direction within the tolerable direction range LR. In an assembly process of the vehicle-mounted camera 100, deviation sometimes occurs with respect to the optical axis L in terms of a design value because of an assembly error. The vehicle-mounted camera 100 in this preferred embodiment is able to calibrate the deviation with respect to the most preferable optical axis direction with electronic processing.

The processing circuit 4 mounted on the processing board of the vehicle-mounted camera 100 is preferably capable of executing at least attachment direction detection processing and direction calculation processing by electronically processing an image captured by the camera main assembly 2.

Attachment direction detection processing executed by the processing circuit 4 will now be described. In the attachment direction detection processing, first, in a state in which the vehicle-mounted camera 100 is attached to the glass surface 51 via the attachment member 60, the camera main assembly 2 captures an image of a target object for direction detection located in a known direction when viewed from the vehicle body 1. Consequently, the processing circuit 4 acquires a captured target object image of the target object for direction detection. Further, the processing circuit 4 detects the position of the target object for direction detection on the captured target object image. On the other hand, the processing circuit 4 causes, on the basis of the known direction, the driver to recognize an original position, which is a position where the target object for direction detection should be originally present on the image. The processing circuit element 4 calculates an attachment direction deviation using the original position and the position on the image and records the attachment direction deviation. That is, the processing circuit 4 calculates an attachment direction deviation of the camera main assembly 2 using the known direction and the position of the target object for direction detection and stores the attachment direction deviation.

Direction calculation processing executed by the processing circuit 4 will now be described. In the direction calculation processing, the processing circuit 4 calculates an original direction in which the object is located when viewed from the vehicle body, using the attachment direction deviation calculated by the attachment direction detection processing, from a position on an image of an object captured by the camera main assembly 2. In the direction calculation processing, the processing circuit 4 may calculate an original direction on the basis of the known direction and the position of the target object for direction detection acquired during the calculation of the attachment direction deviation described above. The processing circuit 4 reduces a direction error of the vehicle-mounted camera by executing the direction calculation processing.

Note that the attachment direction detection processing and the direction calculation processing performed by the electronic processing in the processing circuit 4 of the vehicle-mounted camera 100 are described above. Besides, the attachment direction detection processing and the direction calculation processing may be performed according to an image processing program of an external apparatus connected to the vehicle-mounted camera 100.

Figure 9:
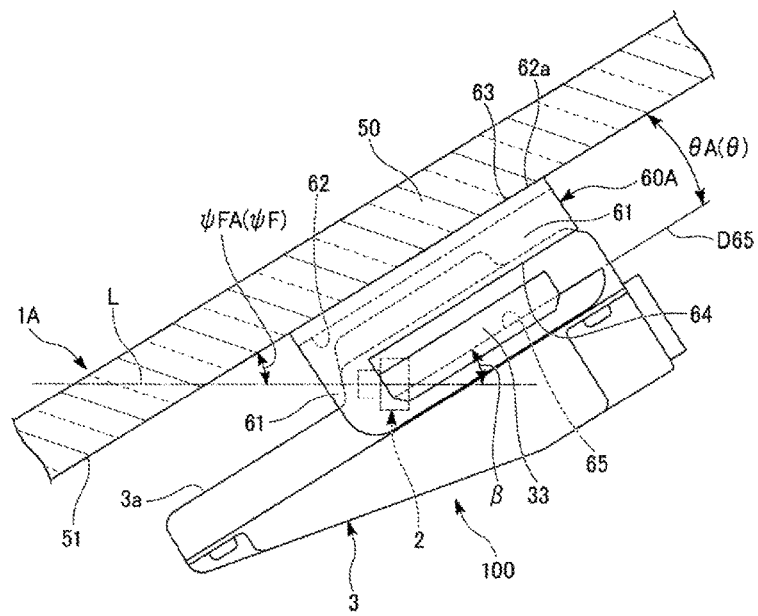
FIG. 9 is a side view of the vehicle-mounted camera and the attachment member according to a preferred embodiment of the present invention and shows a state in which the vehicle-mounted camera is attached to the front window.
Figure 10:
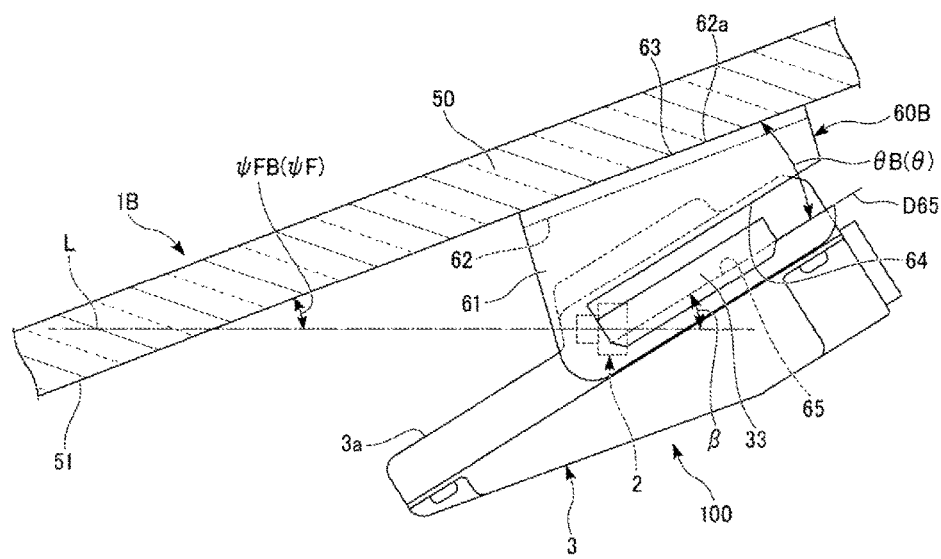
FIG. 10 is a side view of the vehicle-mounted camera and the attachment member according to a preferred embodiment of the present invention and shows a state in which the vehicle-mounted camera is attached to the front window.

A method of selecting one positioning angle θ (For example, θA or θB). θA or θB from the plurality of positioning angles θA, θB, θC . . . will now be described. FIG. 9 is a side view of the vehicle-mounted camera 100 attached to a vehicle body 1A via the attachment member 60A having the positioning angle θA. The front window 50 of the vehicle body 1A has an inclination angle ψFA. FIG. 10 is a side view of the vehicle-mounted camera 100 attached to a vehicle body 1B via the attachment member 60B having the positioning angle θB. The front window 50 of the vehicle body 1B has an inclination angle ψFB. Note that, in FIGS. 9 and 10, illustration of the leaf springs 66 and the concaves 64c (see FIG. 6) provided in the openings for attachment 64 of the attachment members 60A and 60B is omitted.

In the vehicle body 1A and the vehicle body 1B, the inclination angles ψFA and ψFB of the front window 50 have a relation of ψFA>ψFB. The positioning angle θA of the attachment member 60A is 0°. The positioning angles θA and θB of the attachment members 60A and 60B have a relation of θB>θA.

Note that FIGS. 9 and 10 are side views schematically showing the front window 50, the attachment members 60A and 60B, and the vehicle-mounted camera 100 to clearly show a fixing relation thereof. The members are illustrated differently from the actual members.

In the following explanation, the vehicle bodies 1A and 1B are described as the vehicle body 1 in common, the attachment members 60A and 60B are described as the attachment member 60 in common, and the positioning angles θA and θB are described as the positioning angle θ in common.

In this preferred embodiment of the present invention, the optical axis L preferably is set in the horizontal direction. Therefore, the inclination angle ψF, which is an angle of depression of the glass surface 51 with respect to the horizontal surface is equal to an angle defined by the glass surface 51 and the optical axis L.

As shown in FIGS. 9 and 10, the direction of the housing-side contact surface 65 is represented as a housing-side contact direction D65 in the attachment member 60. The housing-side contact surface 65 is a set of innumerable housing-side contact points with which the attachment member 60 and the attachment seat 33 are in contact. Therefore, the housing-side contact direction D65 is a direction determined by the three housing-side contact points in the housing-side contact surface.

Note that, in this specification, the direction (the housing-side contact direction D65) refers to a tilting direction in a plane including the front-back direction and the perpendicular direction (the vertical direction). Similarly, the inclination angle ψF, the positioning angle θ, and a difference β described below are angles defined by the directions within the plane including the front-back direction and the perpendicular direction (the vertical direction).

As shown in FIGS. 9 and 10, the housing-side contact direction D65 and the direction of the optical axis L are disposed at an angle difference of the difference β. The difference β is an angle determined by a positional relation between the optical axis L in the camera main assembly 2 and the seat surface 33e of the attachment seat 33 in the vehicle-mounted camera 100. Therefore, the difference β remains unchanged no matter what type of vehicle the vehicle-mounted camera 100 is attached to, as long as the configuration of the vehicle-mounted camera 100 is not changed.

As shown in FIGS. 9 and 10, the positioning angle θ is a difference between the housing-side contact direction D65 and the direction of the glass surface 51 that is in contact with the attachment member at the glass-side contact surface 63.

The inclination angle ψF, the positioning angle θ, and the difference β have a relation of the following Expression 1 calculated as a sum of interior angles of a triangle:

$$\psi F = \beta - \theta \quad \text{(Expression 1)}$$

Note that, in Expression 1, the difference β and the positioning angle θ have positive and negative angles. The difference β is an angle in the direction of the optical axis L with respect to the housing-side contact direction D65. In FIGS. 9 and 10, an angle in a right rotation direction is defined as a positive angle. On the other hand, the positioning angle θ is an angle of the direction of the glass surface 51 with respect to the housing-side contact direction D65. In FIGS. 9 and 10, an angle in a left rotation direction is defined as a positive angle.

Expression 1 can be transformed into the following Expression 2

$$\theta = \beta - \psi F \quad \text{(Expression 2)}$$

The difference β is an angle depending on the configuration of each component of the vehicle-mounted camera 100 and is a constant in this preferred embodiment. On the other hand, the positioning angle θ can be changed by selecting the attachment member 60. That is, an operator who attaches the vehicle-mounted camera 100 to the vehicle body 1 can direct the optical axis L to a preferable direction by appropriately selecting the positioning angle θ on the basis of Expression 2. The operator selects the attachment member 60 having the positioning angle θ closest to the preferable positioning angle θ calculated on the basis of Expression 2. Consequently, it is possible to attach the vehicle-mounted camera 100 to the vehicle body 1 with the optical axis L set within the tolerable direction range LR (see FIG. 1).

Note that, before the above described process, the vehicle-mounted camera having necessary features for the process should be procured in advance. Note that, in Expression 2, when the difference β is larger than the inclination angle ψFB of the glass surface 51, the positive positioning angle θ is calculated. When the difference β is smaller than the inclination angle ψFB, the negative positioning angle θ is calculated. When the positioning angle θ is positive, the attachment member 60 tilting to the lower side as the housing-side contact surface 65 moves forward with respect to the glass-side contact surface 63 is selected. When the positioning angle θ is negative, the attachment member 60 tilting to the upper side as the housing-side contact surface 65 moves forward with respect to the glass-side contact surface 63 is selected.

As shown in FIG. 8, The plurality of positioning angles θA, θB, θC, . . . assumed in advance correspond to the inclination angles ψF in the predetermined angle range. As an example, the plurality of positioning angles θA, θB, θC, . . . are assumed at an interval of about 3°, for example. The positioning angles bear the inclination angles ψF in the range of the width of about 3°, for example. Therefore, if the difference β is equal to 0, according to Expression 1, When the angle range of the inclination angle ψF of the front window 50 is about 18° to about 30° (the width of about 12°), four positioning angles of about 19.5°, about 22.5°, about 25.5°, and about 28.5° are assumed. The respective positioning angles bear the inclination angles ψF in a range of about ±1.5°. As an example, a positioning angle of about 19.5° is selected when the inclination angle ψF is in a range of about 18° to about 21°. A positioning angle of about 22.5° is selected when the inclination angle ψF is in a range of about 21° to about 24°. If the difference β is not equal to 0, the positioning angles are not above value.

As described above, the positioning angle θ (θA, θB) is selected by a predetermined method of referring to the inclination angle ψF (ψFA, ψFB) of the glass surface 51 specified by a car model and the difference β, which is the difference between the housing-side contact direction D65 and the direction of the optical axis L.

Note that, as the "predetermined method" of selecting the positioning angle θ, the method of selecting the preferable positioning angle θ on the basis of Expression 2 is described as an example above. However, other methods may be used. For example, the inclination angles ψF of the glass surface 51 and types of the attachment member 60 having the positioning angles θ selectable with respect to the inclination angles ψF may be prepared as a selection table on the basis of Expression 2 in advance. In this case, selecting the positioning angle θ with reference to the table corresponds to the "predetermined method". When the inclination angle ψF of the glass surface 51 for each of car models is specified, the car models and types of the attachment member 60 having the positioning angle θ selectable with respect to the car models may be prepared as a selection table.

As described above, according to this preferred embodiment of the present invention, it is possible to provide a method of attaching a vehicle-mounted camera that is low in costs and easy in angle adjustment of the optical axis L.

A method of attaching a vehicle-mounted camera according to Variation 1 of a preferred embodiment of the present invention will now be described.

Figure 11:
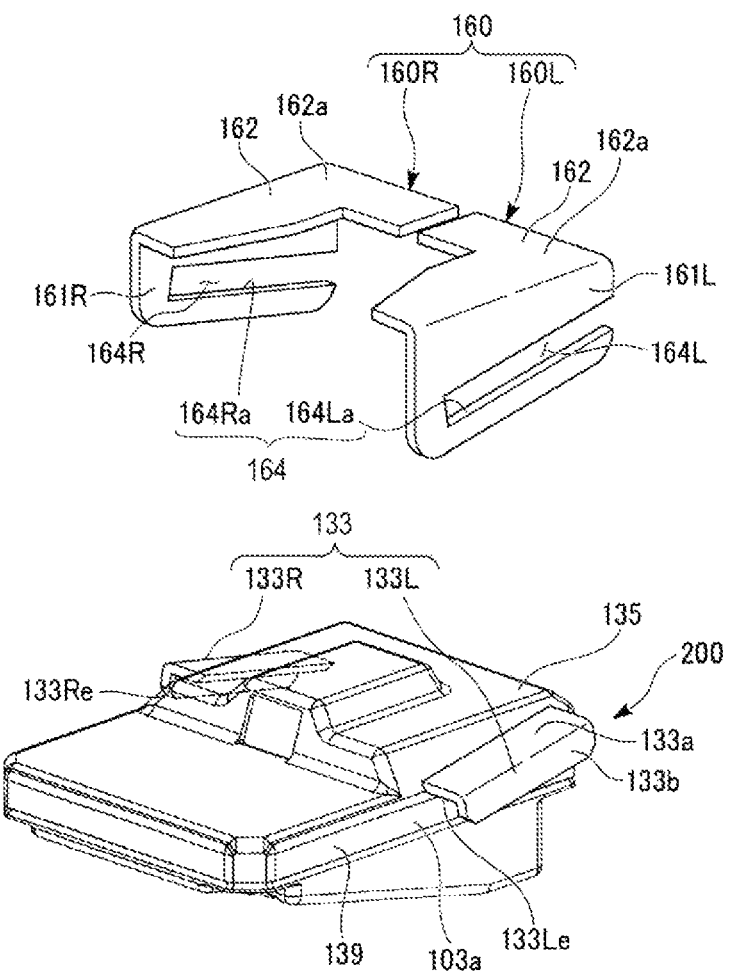
FIG. 11 is a perspective view of a vehicle-mounted camera and an attachment member according to Variation 1 of a preferred embodiment of the present invention.
Figure 12:
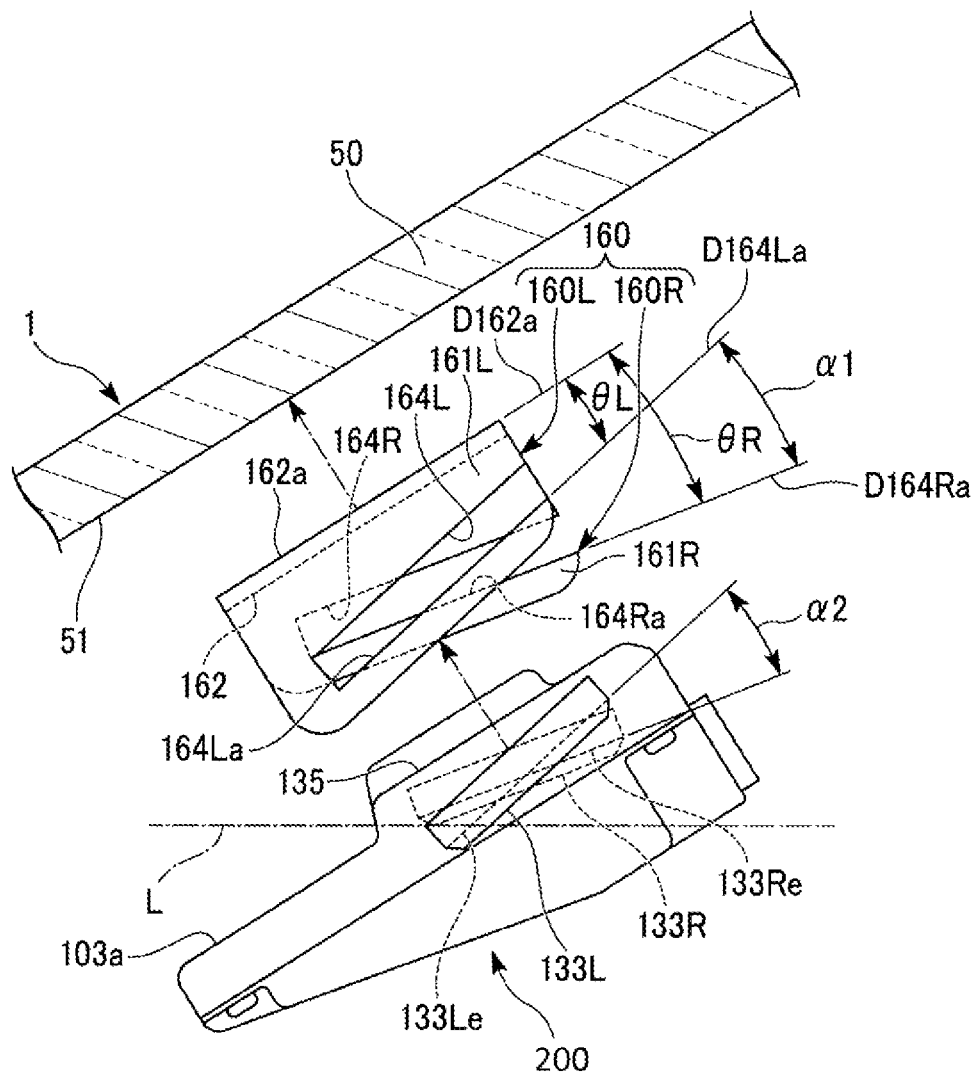
FIG. 12 is a side view of the vehicle-mounted camera and the attachment member according to Variation 1 of a preferred embodiment of the present invention.

FIG. 11 is a perspective view of an attachment member (a positioning member) 160 and a vehicle-mounted camera 200 related to the attaching method according to Variation 1. FIG. 12 is a side view of the attachment member 160 and the vehicle-mounted camera 200 related to the attaching method according to Variation 1. Note that, in FIGS. 11 and 12, illustration of leaf springs (corresponding to the leaf springs 66 shown in FIG. 6) and concaves (corresponding to the concaves 64c shown in FIG. 6) provided in openings for attachment 164L and 164R of the attachment member 160 is omitted for simplicities sake.

Note that components same as the components in the present preferred embodiment described above are denoted by the same reference numerals and signs and explanation of the components is omitted.

As shown in FIG. 11, the vehicle-mounted camera 200 includes a cover housing 103a. The cover housing 103a preferably includes a tabular top plate 135 facing the upper side, a peripheral edge portion 139 extending to the lower side from the peripheral edge of the top plate 135, and an attachment seat 133. The attachment seat 133 includes a first attachment seat 133L, and a second attachment seat 133R.

The first attachment seat 133L and the second attachment seat 133R are respectively provided on width direction both sides of the peripheral edge portion 139 of the cover housing 103a. The first attachment seat 133L and the second attachment seat 133R respectively include width-direction projections 133a and downward projections 133b. The width-direction projections 133a project from the peripheral edge portion 139 toward the width direction outer side. The downward projections 133b project downward from the distal ends of the width-direction projections 133a. On the lower surfaces of the width-direction projections 133a, seat surfaces 133Le and 133Re supported by the attachment member 160 are preferably provided. As shown in FIG. 12, the first seat surface 133Le of the first attachment seat 133L and the second seat surface 133Re of the second attachment seat 133R preferably tilt in opposite directions each other with respect to the front-back direction and extend in the front-back direction. That is, the cover housing 103a includes two seat surfaces (the first seat surface 133Le and the second seat surface 133Re) inclining in different directions around an axis extending in the width direction of the vehicle-mounted camera 200. The direction of the first seat surface 133Le tilts at a housing-side difference angle α2 with respect to the direction of the second seat surface 133Re.

As shown in FIG. 11 and FIG. 12, the attachment member (the positioning member) 160 preferably includes a first attachment member (positioning member) 160L and a second attachment member (positioning member) 160R divided from each other. The first attachment member 160L includes a glass surface fixing portion 162 fixed to the glass surface 51 and a first housing fixing portion 161L that supports the vehicle-mounted camera 200. Similarly, the second attachment member 160R preferably includes the glass surface fixing portion 162 having a flat shape and a second housing fixing portion 161R that supports the vehicle-mounted camera 200.

The glass surface fixing portions 162 of the first attachment member 160L and the second attachment member 160R are disposed adjacent to each other in the width direction. The glass surface fixing portion 162 covers a portion of the top plate 135 of the cover housing 103a from the upper side in a state in which the vehicle-mounted camera 200 is fixed to the attachment member 160. An upper surface 162a of the glass surface fixing portion 162 functions as a glass-side positioning portion configured to come into contact with the glass surface 51 and determine a position of the attachment member 160 with respect to the glass surface 51. That is, the surface of the attachment member 160 includes the glass-side positioning portion (the upper surface) 162a. The glass-side positioning portion 162a is preferably fixed to the glass surface 51 by bonding, for example.

In the first housing fixing portion 161L, an attachment opening 164L piercing through the first housing fixing portion 161L in the width direction is preferably provided. The first attachment seat 133L of the cover housing 103a fits in the attachment opening 164L. A mounting surface 164La, on which the first attachment seat 133L is mounted, is provided on the inner circumferential surface of the attachment opening 164L. The mounting surface 164La functions as a first housing-side positioning portion configured to come into surface contact with the first seat surface 133Le of the first attachment seat 133L and determine a position of the first attachment seat 133L with respect to the attachment member 160. That is, the surface of the attachment member 160 includes a first housing-side positioning portion (the mounting surface) 164La at at least three housing-side contact points.

Similarly, in the second housing fixing portion 161R, an attachment opening 164R, in which the second attachment seat 133R of the cover housing 103a fits, is opening for attachment preferably provided. A mounting surface 164Ra, on which the second attachment seat 133R is mounted, is provided on the inner circumferential surface of the attachment opening 164R. The mounting surface 164Ra functions as a second housing-side positioning portion configured to come into surface contact with the second seat surface 133Re of the second attachment seat 133R and determine a position of the second attachment seat 133R with respect to the attachment member 160. That is, the surface of the attachment member 160 includes a second housing-side positioning portion (the mounting surface) 164Ra at at least three housing-side contact points. That is, a housing-side positioning portion 164 includes the first housing-side positioning portion 164La and the second housing-side positioning portion 164Ra.

As shown in FIG. 12, the first housing-side positioning portion 164La and the second housing-side positioning portion 164Ra preferably incline in directions different from each other around an axis extending in the width direction of the vehicle-mounted camera 200. A direction D164La of the first housing-side positioning portion 164La tilts at a positioning-member-side difference angle α1 with respect to a direction D164Ra of the second housing-side positioning portion 164Ra. The positioning-member-side difference angle α1 coincides with the housing-side difference angle α2.

A first positioning angle θL of the first attachment member 160L is a difference between a direction D162a of the glass-side positioning portion 162a and the direction D164La of the first housing-side positioning portion 164La. On the other hand, a second positioning angle θR of the second attachment member 160R is represented by a difference between the direction D162a of the glass-side positioning portion 162a and the direction D164Ra of the second housing-side positioning portion 164Ra. Therefore, the attachment member 160 includes two positioning angles different from each other (the first positioning angle θL and the second positioning angle θR). However, since the positioning-member-side difference angle α1 and the housing-side difference angle α2 coincide with each other, in a state in which the vehicle-mounted camera 200 is supported, the housing-side difference angle α2 in the vehicle-mounted camera 200 absorbs a difference between the positioning angles (the positioning-member-side difference angle α1). Therefore, the first attachment member 160L and the second attachment member 160R can support the vehicle-mounted camera 200 with the optical axis L direction aligned with respect to the glass surface 51.

As described in this variation, when the attachment member 160 having a plurality of positioning angles θL and θR different from each other is used, a plurality of attachment members having the same relation of the positioning-member-side difference angle α1 and having the different positioning angles θL and θR are prepared for the attachment of the vehicle-mounted camera 200. Consequently, it is possible to appropriately adjust the direction of the optical axis L with respect to the glass surface 51 having various inclination angles ψF and attach the vehicle-mounted camera 200 to the vehicle body 1.

As described in this variation, the vehicle-mounted camera 200 may be attached to the vehicle body 1 by the plurality of attachment members (the first attachment member 160L and the second attachment member 160R) having the positioning angles θL and θR different from each other.

A method of attaching a vehicle-mounted camera according to Variation 2 of a preferred embodiment of the present invention will now be described.

Figure 13:
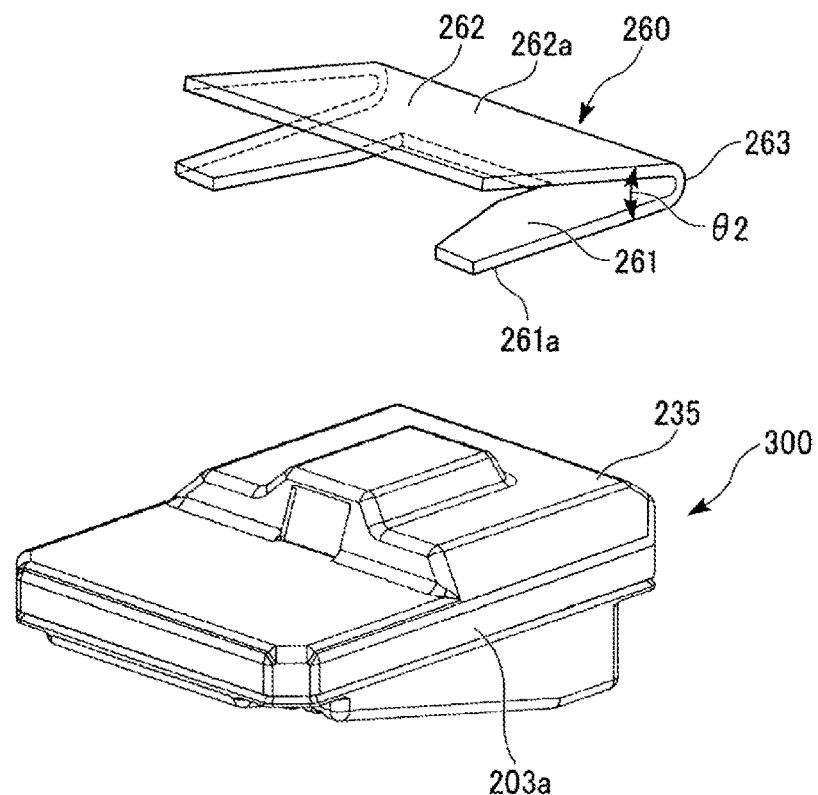
FIG. 13 is a perspective view of a vehicle-mounted camera and an attachment member according to Variation 2 of a preferred embodiment of the present invention.
Figure 14:
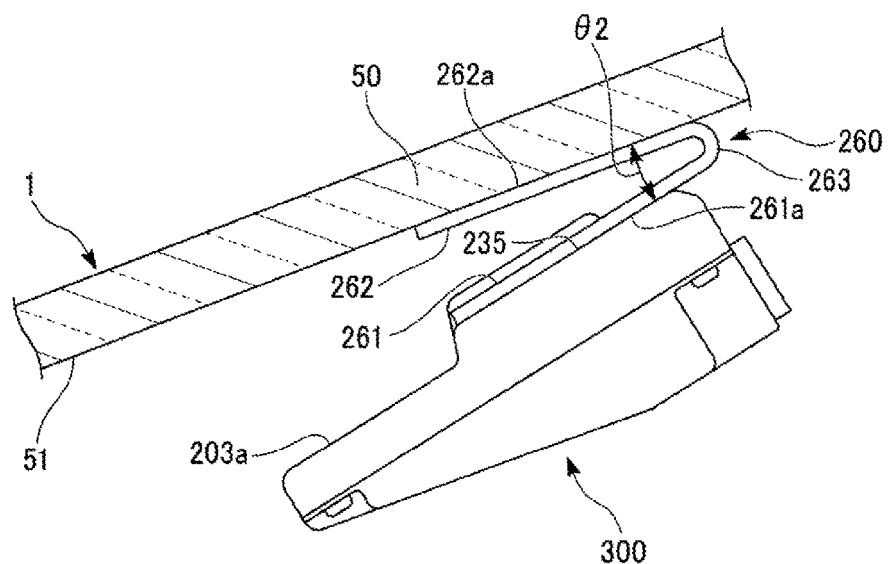
FIG. 14 is a side view of the vehicle-mounted camera and the attachment member according to Variation 2 of a preferred embodiment of the present invention.

FIG. 13 is a perspective view of an attachment member (a positioning member) 260 and a vehicle-mounted camera 300 related to the attaching method according to Variation 2. FIG. 14 is a side view of the attachment member 260 and the vehicle-mounted camera 300 related to the attaching method according to Variation 2.

Note that components same as the components in the preferred embodiment are denoted by the same reference numerals and signs and explanation of the components is omitted.

The vehicle-mounted camera 300 includes a cover housing 203a. The cover housing 203a preferably includes a tabular top plate 235 facing the upper side.

The attachment member (the positioning member) 260 is a tabular member. The attachment member 260 preferably includes a housing fixing portion 261, a glass surface fixing portion 262, and a bent portion 263. The bent portion 263 couples the housing fixing portion 261 and the glass surface fixing portion 262 each other. A portion of the attachment member 260 is bent at an acute angle in a bent portion 263. The housing fixing portion 261 and the glass surface fixing portion 262 are vertically opposed to each other with the housing fixing portion 261 set on the lower side.

An upper surface 262a of the glass surface fixing portion 262 functions as a glass-side positioning portion configured to come into contact with the glass surface 51 and determine a position of the attachment member 260 with respect to the glass surface 51. That is, the surface of the attachment member 260 includes the glass-side positioning portion (the upper surface) 262a. The glass-side positioning portion 262a is in contact with the glass surface 51 via an adhesive to be fixed to the glass surface 51.

A lower surface 261a of the housing fixing portion 261 functions as a housing-side positioning portion configured to come into contact with the top plate 235 of the cover housing 203a and determine a position of the cover housing 203a with respect to the attachment member 260. That is, the surface of the attachment member 260 includes the housing-side positioning portion (the lower surface) 261a. The housing-side positioning portion 261a is in contact with the top plate 235 via an adhesive to be fixed to the top plate 235. Note that the housing-side positioning portion 261a may be fixed to the top plate 235 by a mechanical structure such as bolt fixing.

The bent portion 263 is preferably located between the glass-side positioning portion 262a and the housing-side positioning portion 261a. An angle of bending of the bent portion 263 is a positioning angle θ2, which is a relative angle of the glass-side positioning portion 262a and the housing-side positioning portion 261a.

The attachment member 260 can preferably be molded by, for example, pressing a flat metal plate. The attachment member 260 is required to have sufficient rigidity for the purpose of preventing deformation under an external force. Therefore, the attachment member 260 is preferably made of steel and more preferably made of stainless steel among various kinds of steel. Steel has small spring-back during bending compared with aluminum. Therefore, it is possible to highly accurately determine a positioning angle of the attachment member 260. In the attachment member 260, it is preferable to cut a portion of the surface of at least one of the glass-side positioning portion 262a and the housing-side positioning portion 261a to form a cut surface. Consequently, it is possible to improve accuracy of the positioning angle θ2, which is an angle defined by the glass-side positioning portion 262a and the housing-side positioning portion 261a. However, when the vehicle-mounted camera 300 has a function of calibrating, with electronic processing, deviation with respect to a most preferable optical axis direction like the vehicle-mounted camera 100 according to the preferred embodiment described above, the cutting may not be applied to both of the glass-side positioning portion 262a and the housing-side positioning portion 261a. This is because, although the accuracy of the positioning angle θ2 is slightly deteriorated, the deterioration can be supplemented by the electronic processing.

In the attachment of the vehicle-mounted camera 300 to the vehicle body 1, a plurality of attachment members 260 having a predetermined positioning angles θ2 are preferably prepared in advance. The attachment member 260 having a positioning angle close to the preferable positioning angle θ2 is selected on the basis of the inclination angle ψF of the glass surface 51 of the vehicle body 1. Consequently, it is possible to attach the vehicle-mounted camera 300 to the vehicle body 1 with the optical axis L set within the tolerable direction range LR (see FIG. 1).

Figure 15:
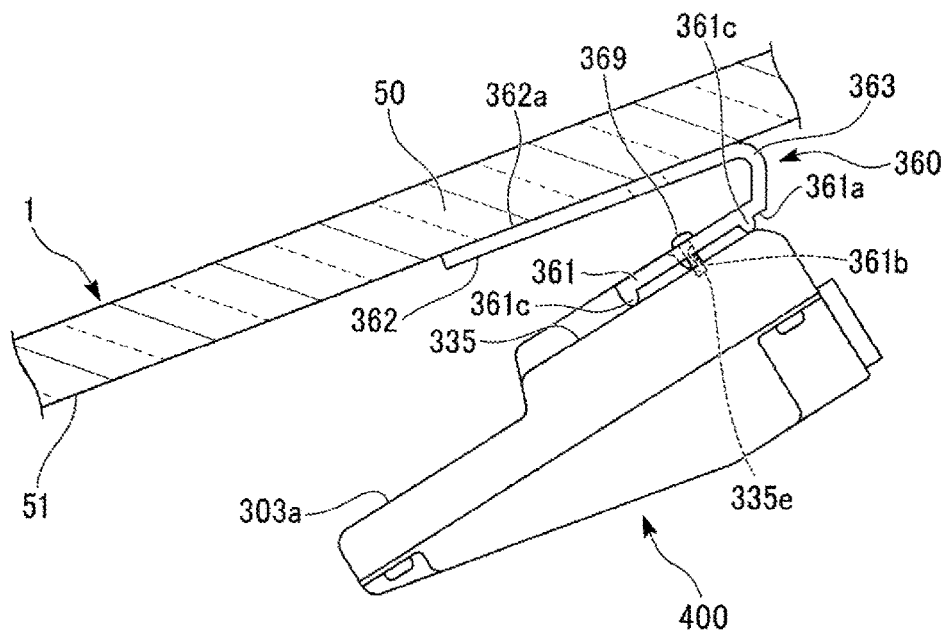
FIG. 15 is a side view of a vehicle-mounted camera and an attachment member according to Variation 3 of a preferred embodiment of the present invention.
Figure 16:
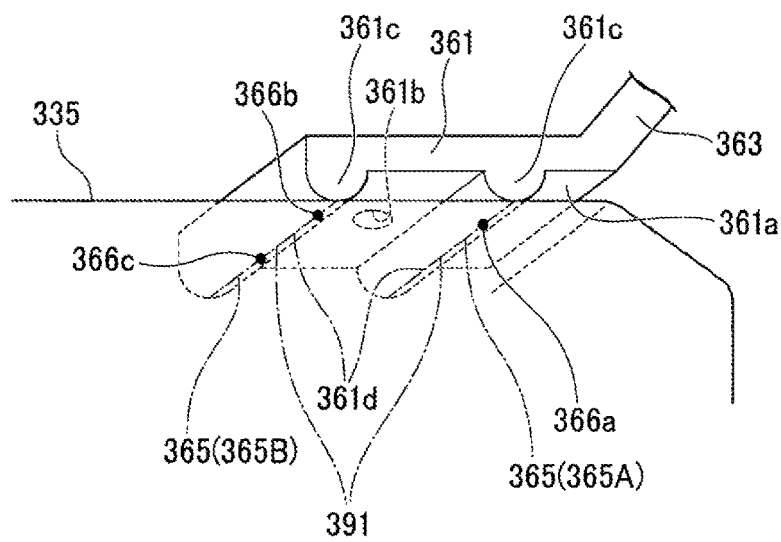
FIG. 16 is an enlarged perspective view of a fixing portion of the vehicle-mounted camera and the attachment member according to Variation 3 of a preferred embodiment of the present invention.

A method of attaching a vehicle-mounted camera according to Variation 3 will now be described. FIG. 15 is a side view of an attachment member (a positioning member) 360 and a vehicle-mounted camera 400 related to the attaching method according to Variation 3. FIG. 16 is an enlarged perspective view of a fixing portion of the vehicle-mounted camera 400 and the attachment member 360.

Note that components same as the components in the preferred embodiment are denoted by the same reference numerals and signs and explanation of the components is omitted.

The vehicle-mounted camera 400 includes a cover housing 303a. The cover housing 303a includes a tabular top plate (attachment seat) 335 facing the upper side. In the top plate 335, a screw hole 335e used in screwing a screw 369 that fixes the attachment member 360 is provided. In this variation, the top plate 335 also functions as an attachment seat that comes into contact with the attachment member 360 and is fixed thereto.

The attachment member (the positioning member) 360 preferably includes a glass surface fixing portion 362, a coupling portion 363 extending downward from the rear end of the glass surface fixing portion 362, and a housing fixing portion 361 located at the lower end of the coupling portion 363.

An upper surface 362a of the glass surface fixing portion 362 functions as a glass-side positioning portion configured to be bonded and fixed to the glass surface 51 and determine a position of the attachment member 360 with respect to the glass surface 51. That is, the surface of the attachment member 360 includes the glass-side positioning portion (the upper surface) 362a.

The housing fixing portion 361 preferably includes an opposed surface 361a opposed to the top plate 335. In the opposed surface 361a, a through-hole 361b piercing through the housing fixing portion 361 is opened. The screw 369 screwed in the screw hole 335e of the top plate 335 is inserted into the through-hole 361b. On the opposed surface 361a, a pair of housing-side projecting bands 361c extending in the width direction of the vehicle-mounted camera 400 and projecting to the top plate 335 side is provided. A cross section orthogonal to the width direction of the housing-side projecting bands 361c is semicircular.

As shown in FIG. 16, housing-side positioning portions 361d in contact with the top plate 335 are provided at the distal ends of the housing-side projecting bands 361c. Since the distal ends of the housing-side projecting bands 361c are curved surfaces, the contact of the attachment member 360 and the top plate 335 is line contact. Therefore, the housing-side positioning portions 361d are straight lines extending in the width direction of the vehicle-mounted camera 400.

A pair of housing-side positioning portions 361d of the attachment member 360 and the top plate 335 are in line contact and define a pair of housing-side contact lines 365. The pair of housing-side contact lines 365 is respectively sets of innumerable contact points (housing-side contact points). Among the innumerable housing-side contact points, one point is provided in a position different from a straight line passing through the other two points. Consequently, a degree of freedom of the top plate 335 with respect to the housing-side positioning portion 361d can be set to zero. One housing-side contact point 366a is selected from one housing-side contact line 365A of the pair of housing-side contact lines 365. Two housing-side contact points 366b and 366c are selected from the other housing-side contact line 365B. At this point, the three housing-side contact points 366a, 366b, and 366c are not aligned in the same linear shape. Therefore, according to this variation, the top plate 335 is stably supported with respect to the attachment member 360.

In this variation, the housing fixing portion 361 is preferably in contact with the top plate 335 on the pair of housing-side contact lines 365 and defines a pair of first edges 391. That is, the housing-side positioning portions 361d include the first edges 391 configured to come into contact with the top plate (the attachment seat) 335. Since the housing-side contact line 365 is a set of housing-side contact points, at least one point among the housing-side contact points is located on the first edges 391. With such a configuration, the attachment member 360 and the top plate 335 are in contact at the first edges 391. The attachment member 360 stably supports the top plate 335.

Note that, in this variation, the sectional shape of the housing-side projecting bands 361c is not limited to the semicircular shape. The housing-side projecting bands 361c may alternatively have any sectional shape as long as the housing-side projecting bands 361c are in contact with the top plate (the attachment seat) 335 to configure the first edges 391 extending in the width direction.

Preferred embodiments of the present invention and variations thereof have been described above. However, the components, the combinations of the components, and the like in the preferred embodiment and the variations are examples. Addition, omission, replacement, and other changes of components are possible within a range not departing from the spirit of the present invention. The present invention is not limited by the preferred embodiment.

For example, in the preferred embodiments of the present invention and variations thereof, the at least three housing-side contact points may be disposed on a curved surface. That is, the contact surface (the housing-side contact surface) of the attachment member and the attachment seat may be a curved surface. In this case, the direction (the housing-side contact direction) determined by the housing-side contact points can be defined as a direction of a surface defined by the at least three housing-side contact points not linearly aligned in the housing-side contact surface.

Similarly, the at least three glass-side contact points may be disposed on a curved surface. That is, the contact surface (the glass-side contact surface) of the attachment member and the glass surface may be a curved surface. In this case, the direction determined by the glass-side contact points can be defined as a direction of a surface defined by the at least three glass-side contact points not linearly aligned in the glass-side contact surface.

As the preferred embodiments of the present invention and variations thereof, the example in which the housing includes the cover housing and the base housing is described. However, the housing may include only the cover housing. In this case, the cover housing may cover the lower side of the processing board.

In the preferred embodiments of the present invention and variations thereof, the cover housing and the base housing are made of aluminum or an aluminum alloy. However, the cover housing and the base housing may be made of other metal materials or resin materials. Similarly, the attachment member may be made of metal materials or resin materials other than steel.

In the preferred embodiments of the present invention and variations thereof, both of the glass surface fixing portion and the housing fixing portion configuring the attachment member have the tabular shape. However, the glass surface fixing portion and the housing fixing portion may have other shapes. The shape of the attachment member is not particularly limited as long as the attachment member includes the housing-side positioning portion and the glass-side positioning portion. For example, the attachment member may be a member including a recess capable of housing an upper portion of the housing. In the preferred embodiments of the present invention and variations thereof, since the example in which the vehicle-mounted camera is fixed by the attachment member is described, the name "attachment member" is used. However, a structure not to be fixed can also be adopted. For example, the vehicle-mounted camera may be pressed and fixed by another member such as a spring while the direction of the vehicle-mounted camera is stabilized by the housing-side positioning portion and the glass-side positioning portion. In such a case, it is easier to understand the member including the housing-side positioning portion and the glass-side positioning portion if a name "positioning member" is given to the member. This is also within the scope of the present invention. Even when the vehicle-mounted camera is fixed by the attachment member, since the attachment member simultaneously performs positioning as well, the name "positioning member" may be given instead of the attachment member.

In addition to the camera main assembly, other vehicle-mounted devices such as a rain sensor, a millimeter wave radar sensor, and a laser radar sensor may be mounted on the vehicle-mounted cameras according to the preferred embodiments of the present invention and variations thereof.

A configuration can also be adopted in which the lens assembly of the camera main assembly reaches the outer side from the viewing window of the cover housing.

While preferred embodiments of the present invention and variations thereof have been described above, it is to be understood that additional variations and modifications will be apparent to those skilled in the art without departing from the scope and spirit of the present invention. The scope of the present invention, therefore, is to be determined solely by the following claims.

What is claimed is:

1. A method of attaching a vehicle-mounted camera including a cover housing including a tabular top plate and a camera main assembly, the vehicle-mounted camera being attached to a glass surface on a vehicle interior side of a window glass via a positioning member in a posture in which the top plate extends along the window glass facing forward or rearward of a vehicle body, and capable of capturing an image of a scene of a vehicle exterior, the method comprising:
assuming in advance a plurality of inclination angles as inclination angles of the glass surface;
assuming in advance a plurality of positioning angles smaller in number than the plurality of inclination angles;
specifying an inclination angle of the glass surface of the vehicle body to which the vehicle-mounted camera is to be attached to provide a specified inclination angle;
selecting at least one positioning angle from the plurality of positioning angles assumed in advance and preparing a positioning member having the at least one positioning angle selected to provide a prepared positioning member; and
fixing the vehicle-mounted camera to the glass surface of the vehicle body via the prepared positioning member; wherein
the camera main assembly includes a lens assembly and an image sensor;
the cover housing includes an attachment seat;
a surface of the prepared positioning member includes a housing-side positioning portion to come into contact with the attachment seat at at least three housing-side contact points and a glass-side positioning portion to come into contact with the glass surface of the vehicle body at at least three glass-side contact points;
one point among the at least three housing-side contact points is provided in a position different from a straight line passing through remaining points of the at least three housing-side contact points;
one point among the at least three glass-side contact points is provided in a position different from a straight line passing through remaining points of the at least three glass-side contact points;
the at least one positioning angle selected is a difference between a direction determined by the at least three housing-side contact points and a direction determined by the at least three glass-side contact points;
the at least one positioning angle selected is selected by a method of referring to the specified inclination angle of the glass surface and a difference between the direction determined by the at least three housing-side contact points and a direction of an optical axis of the camera main assembly;
the vehicle-mounted camera includes:
a board connected to the camera main assembly and accommodated in the cover housing; and
a processing circuit mounted on the board and capable of executing, by electronically processing an image captured by the camera main assembly, at least attachment direction detection processing and direction calculation processing;
in the attachment direction detection processing, in a state in which the vehicle-mounted camera is attached to the glass surface via the positioning member, a target object image of a target object for direction detection located in a known direction when viewed from the vehicle body is acquired through image-capturing by the camera main assembly;
a position of the target object for direction detection on the target object image is detected;
an attachment direction deviation of the camera main assembly calculated using the known direction and the position of the target object for direction detection is retained in the processing circuit; and
in the direction calculation processing, from a position on an image of an object captured by the camera main assembly, a direction in which the object is located when viewed from the vehicle body is calculated using both of the known direction and the position of the target object for direction detection or the attachment direction deviation.

2. The method of attaching the vehicle-mounted camera according to claim 1, wherein when the positioning member having the at least one positioning angle selected is prepared:
a plurality of kinds of positioning members respectively having any ones of the plurality of positioning angles are prepared; and
one kind of positioning member is selected out of the plurality of kinds of positioning members.

3. The method of attaching the vehicle-mounted camera according to claim 1, wherein
the attachment seat includes a first attachment seat and a second attachment seat;
the housing-side positioning portion includes a first housing-side positioning portion to come into contact with the first attachment seat at at least three housing-side contact points and a second housing-side positioning portion to come into contact with the second attachment seat at at least three housing-side contact points;

a direction of the first housing-side positioning portion is different from a direction of the second housing-side positioning portion by a positioning-member-side difference angle;

the first attachment seat is in contact with the first housing-side positioning portion on a first seat surface, the second attachment seat is in contact with the second housing-side positioning portion on a second seat surface, and a direction of the first seat surface is different from a direction of the second seat surface by a housing-side difference angle; and the positioning-member-side difference angle coincides with the housing-side difference angle.

4. The method of attaching the vehicle-mounted camera according to claim 2, wherein the attachment seat includes a first attachment seat and a second attachment seat;

the housing-side positioning portion includes a first housing-side positioning portion to come into contact with the first attachment seat at at least three housing-side contact points and a second housing-side positioning portion to come into contact with the second attachment seat at at least three housing-side contact points;

a direction of the first housing-side positioning portion is different from a direction of the second housing-side positioning portion by a positioning-member-side difference angle;

the first attachment seat is in contact with the first housing-side positioning portion on a first seat surface, the second attachment seat is in contact with the second housing-side positioning portion on a second seat surface, and a direction of the first seat surface is different from a direction of the second seat surface by a housing-side difference angle; and the positioning-member-side difference angle coincides with the housing-side difference angle.

5. The method of attaching the vehicle-mounted camera according to claim 3, wherein the positioning member includes a first positioning member and a second positioning member divided from each other; and the first positioning member includes a first housing-side positioning portion, and the second positioning member includes a second housing-side positioning portion.

6. The method of attaching the vehicle-mounted camera according to claim 4, wherein the positioning member includes a first positioning member and a second positioning member divided from each other; and the first positioning member includes a first housing-side positioning portion, and the second positioning member includes a second housing-side positioning portion.

7. The method of attaching the vehicle-mounted camera according to claim 1, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

8. The method of attaching the vehicle-mounted camera according to claim 2, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

9. The method of attaching the vehicle-mounted camera according to claim 3, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

10. The method of attaching the vehicle-mounted camera according to claim 4, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

11. The method of attaching the vehicle-mounted camera according to claim 5, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

12. The method of attaching the vehicle-mounted camera according to claim 6, wherein at least one of the attachment seat and the housing-side positioning portion includes a first edge to come into contact with the other or the glass-side positioning portion includes a second edge to come into contact with the glass surface; and at least one point among the housing-side contact points is located on the first edge or at least one point among the glass-side contact points is located on the second edge.

13. The method of attaching the vehicle-mounted camera according to claim 1, wherein at least one of the housing-side positioning portion and the glass-side positioning portion is a cut surface obtained by cutting a portion of a surface of the positioning member.

14. The method of attaching the vehicle-mounted camera according to claim 2, wherein at least one of the housing-side positioning portion and the glass-side positioning portion is a cut surface obtained by cutting a portion of a surface of the positioning member.

15. The method of attaching the vehicle-mounted camera according to claim 3, wherein at least one of the housing-side positioning portion and the glass-side positioning portion is a cut surface obtained by cutting a portion of a surface of the positioning member.

16. The method of attaching the vehicle-mounted camera according to claim 5, wherein at least one of the housing-side positioning portion and the glass-side positioning portion is a cut surface obtained by cutting a portion of a surface of the positioning member.

17. The method of attaching the vehicle-mounted camera according to claim 7, wherein at least one of the housing-side positioning portion and the glass-side positioning portion is a cut surface obtained by cutting a portion of a surface of the positioning member.

18. The method of attaching the vehicle-mounted camera according to claim 9, wherein at least one of the housing-side positioning portion and the glass-side positioning portion is a cut surface obtained by cutting a portion of a surface of the positioning member.

19. The method of attaching the vehicle-mounted camera according to claim 11, wherein at least one of the housing-side positioning portion and the glass-side positioning portion is a cut surface obtained by cutting a portion of a surface of the positioning member.

20. The method of attaching the vehicle-mounted camera according to claim 12, wherein at least one of the housing-side positioning portion and the glass-side positioning portion is a cut surface obtained by cutting a portion of a surface of the positioning member.

21. The method of attaching the vehicle-mounted camera according to claim 1, wherein
the positioning member is a tabular member;
the positioning member includes a bent portion; and
the bent portion is located between the housing-side positioning portion and the glass-side positioning portion.

22. The method of attaching the vehicle-mounted camera according to claim 2, wherein
the positioning member is a tabular member;
the positioning member includes a bent portion; and
the bent portion is located between the housing-side positioning portion and the glass-side positioning portion.

23. The method of attaching the vehicle-mounted camera according to claim 4, wherein
the positioning member is a tabular member;
the positioning member includes a bent portion; and
the bent portion is located between the housing-side positioning portion and the glass-side positioning portion.

24. The method of attaching the vehicle-mounted camera according to claim 6, wherein
the positioning member is a tabular member;
the positioning member includes a bent portion; and
the bent portion is located between the housing-side positioning portion and the glass-side positioning portion.

25. The method of attaching the vehicle-mounted camera according to claim 12, wherein
the positioning member is a tabular member;
the positioning member includes a bent portion; and
the bent portion is located between the housing-side positioning portion and the glass-side positioning portion.

26. The method of attaching the vehicle-mounted camera according to claim 20, wherein
the positioning member is a tabular member;
the positioning member includes a bent portion; and
the bent portion is located between the housing-side positioning portion and the glass-side positioning portion.

27. The method of attaching the vehicle-mounted camera according to claim 1, wherein
the cover housing is made of aluminum or an aluminum alloy; and
the positioning member is made of steel.

28. The method of attaching the vehicle-mounted camera according to claim 4, wherein
the positioning member is a tabular member;
the positioning member includes a bent portion; and
the bent portion is located between the housing-side positioning portion and the glass-side positioning portion.

29. The method of attaching the vehicle-mounted camera according to claim 6, wherein
the positioning member is a tabular member;
the positioning member includes a bent portion; and
the bent portion is located between the housing-side positioning portion and the glass-side positioning portion.

30. The method of attaching the vehicle-mounted camera according to claim 12, wherein
the positioning member is a tabular member;
the positioning member includes a bent portion; and
the bent portion is located between the housing-side positioning portion and the glass-side positioning portion.

31. The method of attaching the vehicle-mounted camera according to claim 20, wherein
the positioning member is a tabular member;
the positioning member includes a bent portion; and
the bent portion is located between the housing-side positioning portion and the glass-side positioning portion.

32. The method of attaching the vehicle-mounted camera according to claim 26, wherein
the positioning member is a tabular member;
the positioning member includes a bent portion; and
the bent portion is located between the housing-side positioning portion and the glass-side positioning portion.

33. The method of attaching the vehicle-mounted camera according claim 1, wherein the glass-side positioning portion is in contact with the glass surface via an adhesive.

34. The method of attaching the vehicle-mounted camera according claim 2, wherein the glass-side positioning portion is in contact with the glass surface via an adhesive.

35. The method of attaching the vehicle-mounted camera according claim 4, wherein the glass-side positioning portion is in contact with the glass surface via an adhesive.

36. The method of attaching the vehicle-mounted camera according claim 6, wherein the glass-side positioning portion is in contact with the glass surface via an adhesive.

37. The method of attaching the vehicle-mounted camera according claim 12, wherein the glass-side positioning portion is in contact with the glass surface via an adhesive.

38. The method of attaching the vehicle-mounted camera according claim 20, wherein the glass-side positioning portion is in contact with the glass surface via an adhesive.

39. The method of attaching the vehicle-mounted camera according claim 26, wherein the glass-side positioning portion is in contact with the glass surface via an adhesive.

40. The method of attaching the vehicle-mounted camera according claim 32, wherein the glass-side positioning portion is in contact with the glass surface via an adhesive.

* * * * *